(12) United States Patent
Ueda et al.

(10) Patent No.: US 8,560,107 B2
(45) Date of Patent: Oct. 15, 2013

(54) SUBSTRATE PROCESSING SYSTEM

(75) Inventors: Osamu Ueda, Toyama (JP); Hiroyuki Iwakura, Toyama (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 782 days.

(21) Appl. No.: 11/892,367

(22) Filed: Aug. 22, 2007

(65) Prior Publication Data

US 2008/0086229 A1 Apr. 10, 2008

(30) Foreign Application Priority Data

Aug. 24, 2006 (JP) .................. 2006-228160
Aug. 9, 2007 (JP) .................. 2007-208456

(51) Int. Cl.
*G06F 19/00* (2011.01)
*G06F 9/44* (2006.01)
*G11C 11/34* (2006.01)

(52) U.S. Cl.
USPC ........ 700/108; 700/121; 700/95; 365/185.08; 717/168; 717/174

(58) Field of Classification Search
USPC ........ 700/108, 121, 95; 365/185.08; 717/168, 717/174
See application file for complete search history.

(56) References Cited

U.S. PATENT DOCUMENTS

| | | | | |
|---|---|---|---|---|
| 6,134,482 A * | 10/2000 | Iwasaki | ........................ | 700/121 |
| 6,148,246 A * | 11/2000 | Kawazome | ................... | 700/121 |
| 7,069,101 B1 * | 6/2006 | Arackaparambil et al. | .. | 700/121 |
| 7,392,107 B2 * | 6/2008 | Popp | ............................ | 700/110 |
| 7,403,984 B2 * | 7/2008 | Ellis et al. | ...................... | 709/223 |
| 2001/0046157 A1 * | 11/2001 | Haraguchi et al. | ........ | 365/185.08 |
| 2002/0065837 A1 * | 5/2002 | Roach et al. | .................. | 707/200 |
| 2002/0111708 A1 * | 8/2002 | Nakano | ......................... | 700/121 |
| 2004/0145766 A1 * | 7/2004 | Sugishita et al. | ............ | 358/1.13 |
| 2004/0187103 A1 * | 9/2004 | Wickham et al. | ............. | 717/168 |
| 2005/0144000 A1 * | 6/2005 | Yamasaki et al. | ............. | 704/252 |
| 2005/0187649 A1 * | 8/2005 | Funk et al. | ..................... | 700/121 |
| 2006/0064188 A1 * | 3/2006 | Ushiku et al. | ................... | 700/96 |
| 2006/0064192 A1 * | 3/2006 | Shimizu | ........................ | 700/121 |
| 2006/0082837 A1 * | 4/2006 | Hiroe et al. | ................... | 358/448 |
| 2006/0206229 A1 * | 9/2006 | Kitamoto et al. | ............. | 700/121 |
| 2006/0241803 A1 * | 10/2006 | Kitamoto et al. | ............. | 700/121 |
| 2007/0220503 A1 * | 9/2007 | Fan et al. | ...................... | 717/168 |
| 2008/0005733 A1 * | 1/2008 | Ramachandran et al. | .... | 717/168 |

FOREIGN PATENT DOCUMENTS

| | | |
|---|---|---|
| JP | A-2002-217182 | 8/2002 |
| JP | A-2004-259088 | 9/2004 |

OTHER PUBLICATIONS

Office Action dated Jan. 22, 2013 issued in Japanese Patent Application No. 2007-208456 (with translation).

* cited by examiner

*Primary Examiner* — Kavita Padmanabhan
*Assistant Examiner* — Jason Lin
(74) *Attorney, Agent, or Firm* — Oliff & Berridge, PLC

(57) ABSTRACT

There are provided at least one or more of substrate processing apparatuses that process a substrate, and a group management device connected to each substrate processing apparatus, so that the group management device monitors an operation state of the substrate processing apparatus, thereby grasping a timing of updating a program of the substrate processing apparatus, and when the timing arrives, updates the program.

8 Claims, 14 Drawing Sheets

FIG. 5A

DEVICE CONTROLLER SOFT UPDATE RESERVATION SCREEN (26)

| No (26a) | UPDATE PROGRAM (26b) | UPDATE EXECUTION CONDITION (26c) | UPDATE OBJECT DEVICE (26d) | |
|---|---|---|---|---|
| 01 | Ver: XX.XX | AFTER n-TIMES PROCESSING IS ENDED | SETTING | SETTING (26e) |
| 02 | Ver: XX.XX | AFTER n-TIMES PROCESSING IS ENDED | SETTING | REGISTER CANCEL (26f) |
| . | . | . | . | RETURN (26g) |
| . | . | . | . | |
| . | . | . | . | |
| 10 | Ver: XX.XX | AFTER n-TIMES PROCESSING IS ENDED | SETTING | |

FIG. 5B

UPDATE OBJECT DEVICE SELECTION (26h)

| | | | |
|---|---|---|---|
| DEVICE 1 | DEVICE 2 | DEVICE 3 | DEVICE 4 |
| DEVICE 5 | DEVICE 6 | DEVICE 7 | DEVICE 8 |
| DEVICE 9 | DEVICE 10 | DEVICE 11 | DEVICE 12 |
| DEVICE 13 | DEVICE 14 | DEVICE 15 | DEVICE 16 |
| DEVICE 17 | DEVICE 18 | DEVICE 19 | DEVICE 20 |
| DEVICE 21 | DEVICE 22 | DEVICE 23 | DEVICE 24 |
| DEVICE 25 | DEVICE 26 | DEVICE 27 | DEVICE 28 |
| .. | .. | .. | .. |
| .. | .. | .. | DEVICE nn |

RETURN (26i)

FIG. 12A

EXISTENCE/NONEXISTENCE OF PRODUCTION RESERVATION — 27

DEVICE CONTROLLER SOFT UPDATE RESERVATION SCREEN

| No (27a) | UPDATE PROGRAM (27b) | (27j) | UPDATE EXECUTION CONDITION (27c) | UPDATE OBJECT DEVICE (27d) | | |
|---|---|---|---|---|---|---|
| 01 | Ver: XX.XX | EXISTENCE | NOVEMBER 17, 2007 | SETTING | SETTING | 27e |
| 02 | Ver: XX.XX | NONEXISTENCE | JUNE 5, 2007 | SETTING | REGISTER CANCEL | 27f |
| . | . | . | . | . | RETURN | 27g |
| 10 | Ver: XX.XX | EXISTENCE | MAY 28, 2007 | SETTING | | |

FIG. 12B

UPDATE OBJECT DEVICE SELECTION (27h)

| DEVICE 1 | DEVICE 2 | DEVICE 3 | DEVICE 4 |
|---|---|---|---|
| DEVICE 5 | DEVICE 6 | DEVICE 7 | DEVICE 8 |
| DEVICE 9 | DEVICE 10 | DEVICE 11 | DEVICE 12 |
| DEVICE 13 | DEVICE 14 | DEVICE 15 | DEVICE 16 |
| DEVICE 17 | DEVICE 18 | DEVICE 19 | DEVICE 20 |
| DEVICE 21 | DEVICE 22 | DEVICE 23 | DEVICE 24 |
| DEVICE 25 | DEVICE 26 | DEVICE 27 | DEVICE 28 |
| .. | .. | .. | .. |
| .. | .. | .. | DEVICE nn |

RETURN — 27i

SUBSTRATE PROCESSING SYSTEM

BACKGROUND

1. Technical Field

The present invention relates to a substrate processing system capable of updating a program of a substrate processing apparatus.

2. Background Art

A substrate processing apparatus that processes a substrate such as a silicon wafer has a controller provided with a storage device such as CPU, memory, and HDD. The storage device stores a program for realizing various functions in the substrate processing apparatus. The program is read from the storage device to the memory, and executed by the CPU.

The program is updated regularly or irregularly, for the reason of expanding a function of the substrate processing apparatus and coping with bug. Conventionally, an updating work of the program is performed manually by a maintenance person for every substrate processing apparatus.

Specifically, the program is updated by the maintenance person, so that the substrate processing apparatus is stopped, the program stored in a recording medium such as CD-ROM or FD is read into the substrate processing apparatus, which is then stored in the storage device.

However, when the program of the substrate processing apparatus is updated, the substrate processing apparatus needs to be set in a non-product state. Namely, when the program of the substrate processing apparatus is updated, the maintenance person needs to confirm an operation plan of the substrate processing apparatus beforehand and wait until the substrate processing apparatus is set in the non-product state.

In addition, in a manufacturing factory of a semiconductor device, for example, several tens of substrate processing apparatuses are operated in some cases. In such a case, a load of the maintenance person becomes further larger, if the maintenance person must confirm each operation plan for a plurality of substrate processing apparatuses and make a plan of update and wait until each substrate processing apparatus is set in the non-product state.

SUMMARY OF THE INVENTION

Therefore, an object of the present invention is to provide a substrate processing system capable of updating the program of the substrate processing apparatus only by performing a reservation work of the update program, without confirming the operation plan of the substrate processing apparatus by the maintenance person.

According to a first aspect of the present invention, there is provided a substrate processing system having at least one or more of the substrate processing apparatuses that process the substrate; and a group management device connected to each substrate processing apparatus, so that the group management device monitors an operation state of the substrate processing apparatus, grasps a timing of updating the program of the substrate processing apparatus, and updates the program when the timing arrives.

According to a second aspect of the present invention, there is provided the substrate processing system having at least one or more of the substrate processing apparatuses that process the substrate; and a group management device connected to each substrate processing apparatus, so that the group management device receives an input of a reservation report message showing updating the program of the substrate processing apparatus when production processing is ended by the substrate processing apparatus, monitors the operation state of the substrate processing apparatus and detects an end of the production processing, confirms existence/non-existence of a reservation of the next production processing in the substrate processing apparatus, and updates the program when the substrate processing apparatus does not have a production reservation.

According to a third aspect of the present invention, there is provided a substrate processing system having at least one or more of substrate processing apparatuses that process the substrate; and a group management device connected to each substrate processing apparatus, so that the group management device receives information showing updating the program of the substrate processing apparatus when a production processing of prescribed number of times is ended, priority information showing which processing is prioritized, such as the processing of updating the program and the processing of the next production, monitors an operation state of the substrate processing apparatus and detects an end of the production processing of prescribed number of times, confirms existence/non-existence of the reservation of the next production processing and the priority information in the substrate processing apparatus, and the program is updated when the substrate processing apparatus does not have the next production reservation or even if the substrate processing apparatus has the next production reservation, when the priority information shows priority of updating the program, the program is updated.

According to a fourth aspect of the present invention, there is provided the substrate processing system having the substrate processing apparatus that processes the substrate, and the group management device connected to at least one or more of the substrate processing apparatuses, so that the group management device receives the input of the reservation information showing a schedule date to update the program of the substrate processing apparatus, monitors the operation state of the substrate processing apparatus and detects the end of the production processing, and compares the date of detecting the end of the production processing and the schedule date of the substrate processing apparatus, and when the date of detecting the end of the production processing and the schedule date of the substrate processing apparatus are identical with each other, confirms the existence/non-existence of the production processing in the substrate processing apparatus, and when the substrate processing apparatus does not have the next production reservation, the program is updated.

According to a fifth aspect of the present invention, there is provided the substrate processing system having at least one or more of the substrate processing apparatuses that process the substrate; and the group management device connected to each substrate processing apparatus, so that the group management device receives the input of the reservation information including the priority information showing which of the processing is prioritized, such as the processing of updating of the program of the substrate processing apparatus or the processing of stop operation of the substrate processing apparatus, and the group management device confirms the priority information when a stop operation to be performed to the substrate processing apparatus is detected, and when the priority information shows that the update program should be prioritized, the program is updated before the stop operation is executed to the substrate processing apparatus.

According to the present invention, it is possible to provide the substrate processing system capable of updating the program of the substrate processing apparatus only by performing the reservation work of the update program, without confirming the operation plan of the substrate processing apparatus by the maintenance person.

BRIEF DESCRIPTION OF THE DRAWINGS

FIG. 4 is an outline view of a reservation screen of updating a program displayed in the group management device according to an example 1 of the present invention.

FIG. 5 is an outline view of the reservation screen of updating a program displayed in the group management device according to an example 2 of the present invention, FIG. 5A is an outline view of the reservation screen for performing a reservation of updating the program to a plurality of substrate processing apparatuses simultaneously, and FIG. 5B is an outline view of an update object device selection screen for selecting the substrate processing apparatus, being an update object.

FIG. 12 is an outline view of the reservation screen of updating the program displayed in the group management device according to an example 5 of the present invention, FIG. 12A is an outline view of the reservation screen for performing the reservation of updating the program to a plurality of substrate processing apparatuses simultaneously, and FIG. 12B is an outline view of the update object device selection screen for selecting the substrate processing apparatus, being an update object.

DESCRIPTION OF PREFERRED EMBODIMENTS OF THE INVENTION

A constitution and an operation of the substrate processing system according to an embodiment of the present invention will be explained by using the drawings.

Figure 1:
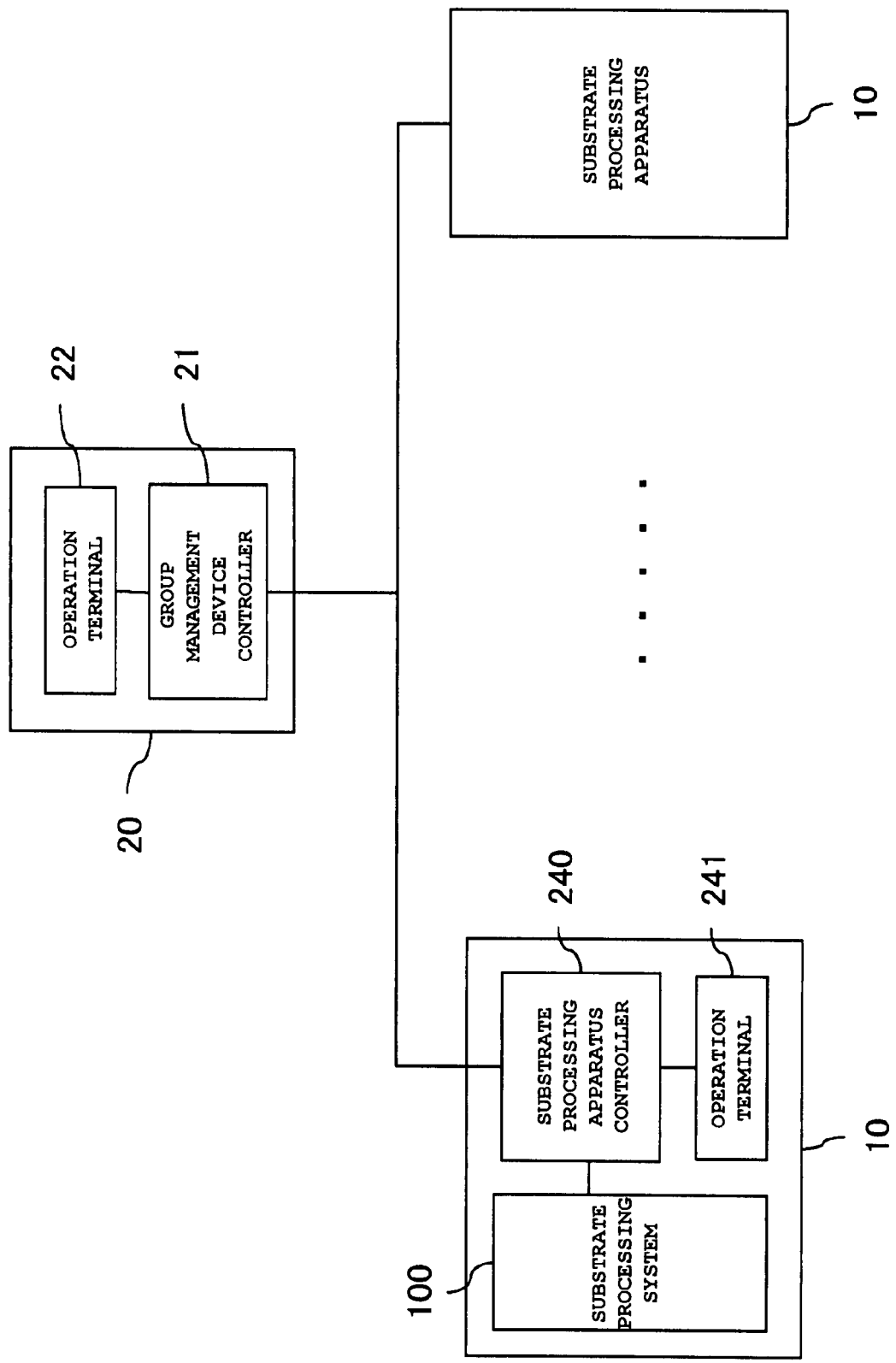
FIG. 1 is an outlined block diagram of a substrate processing system according to an embodiment of the present invention.
Figure 2:
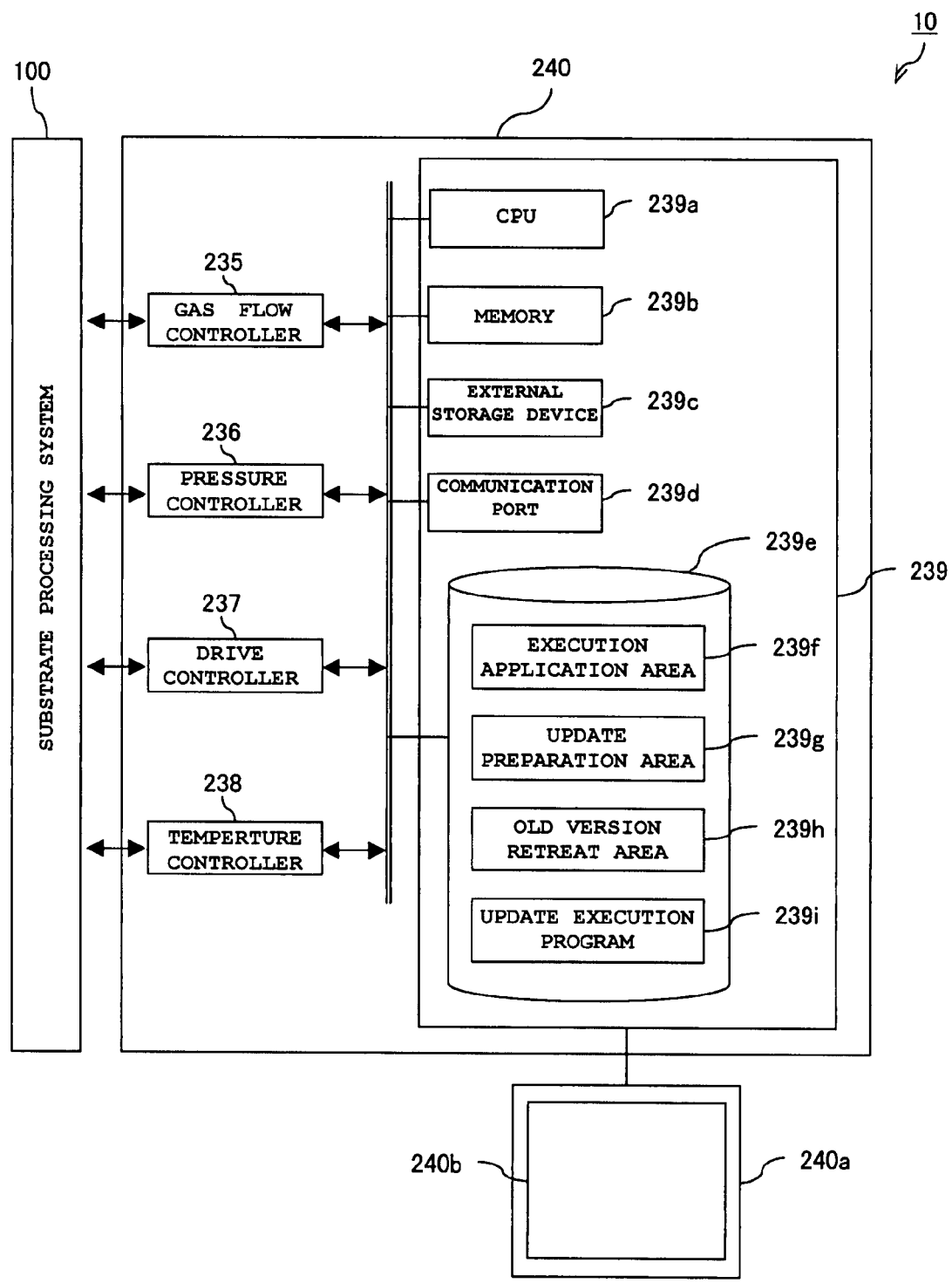
FIG. 2 is a block diagram of the substrate processing apparatus according to an embodiment of the present invention.
Figure 3:
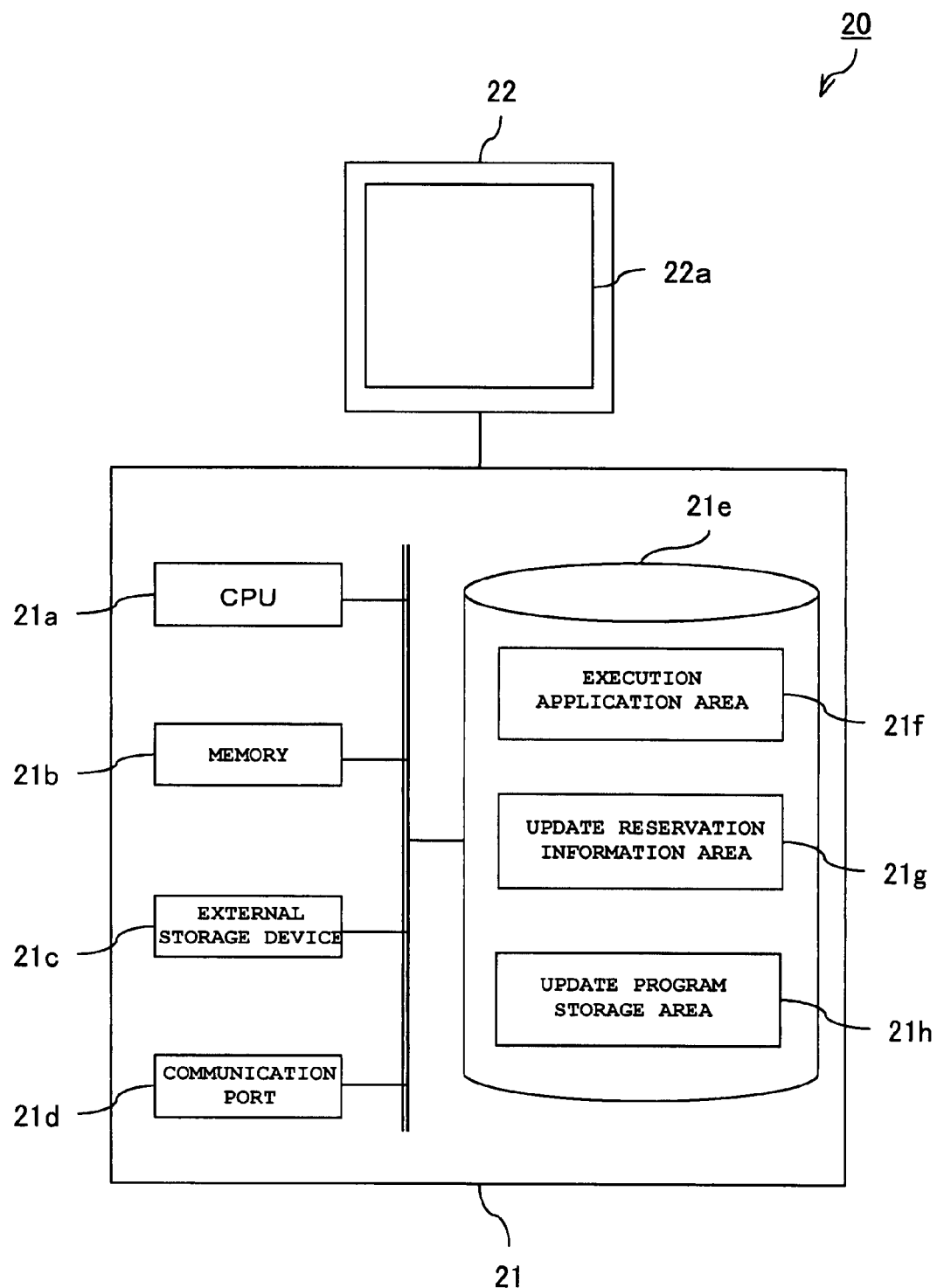
FIG. 3 is a block diagram of a group management device according to an embodiment of the present invention.
Figure 4A:
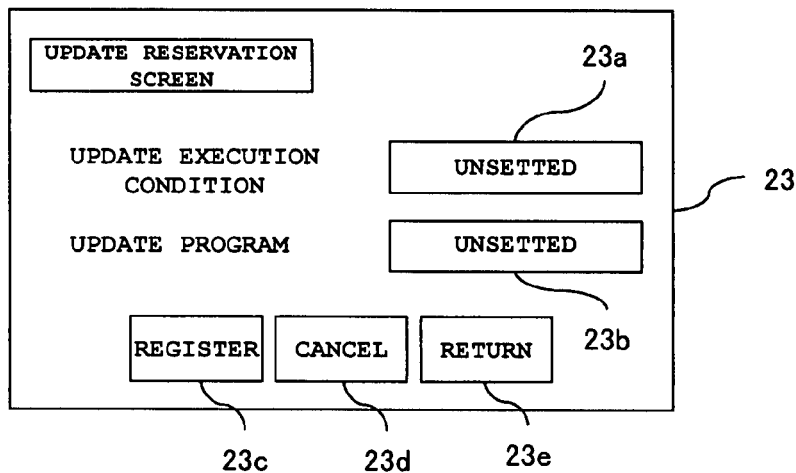
FIG. 4A is an outline view of the reservation screen of updating the program.
Figure 4B:
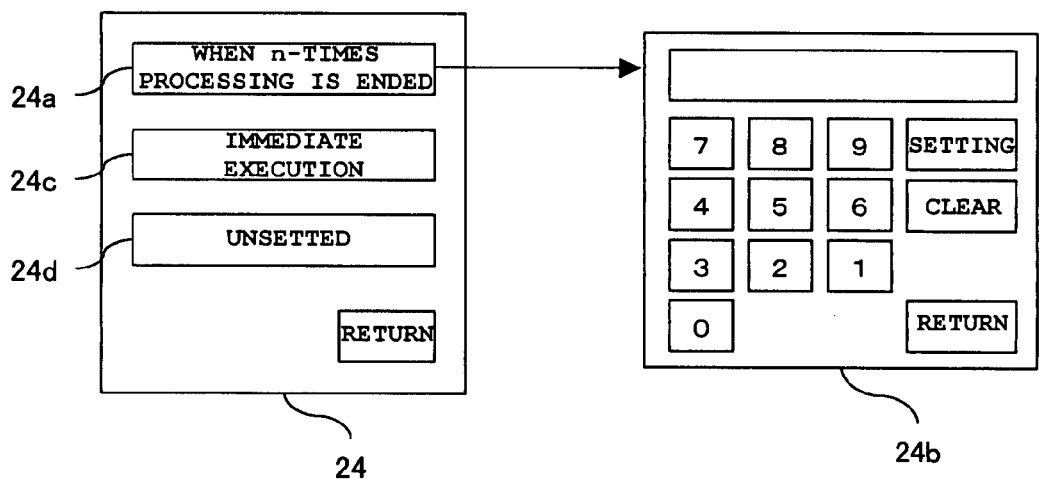
FIG. 4B is an outline view of an update execution condition input screen.
Figure 4C:
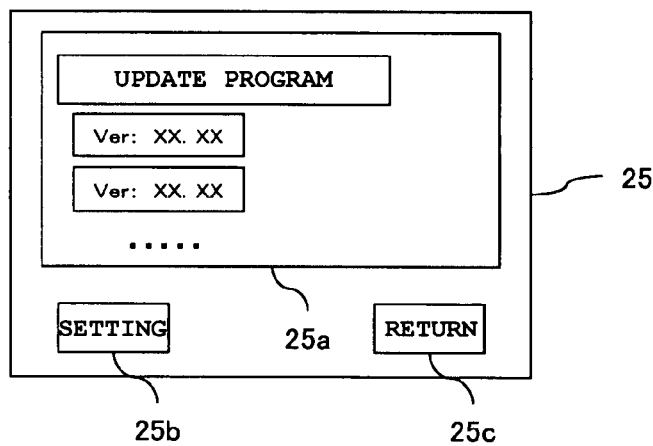
FIG. 4C is an outline view of an update program input screen.
Figure 6:
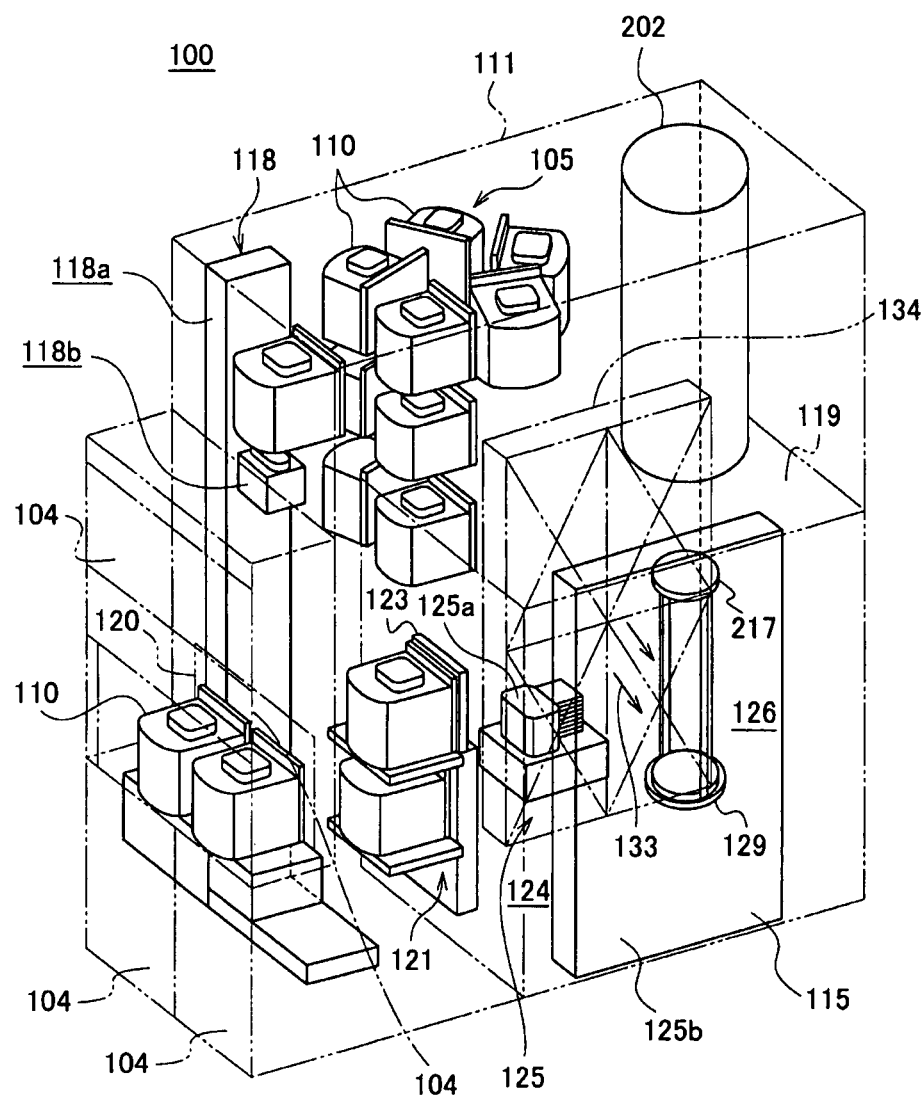
FIG. 6 is a perspective view of the semiconductor processing apparatus showing an example of the substrate processing apparatus according to an embodiment of the present invention.
Figure 7:
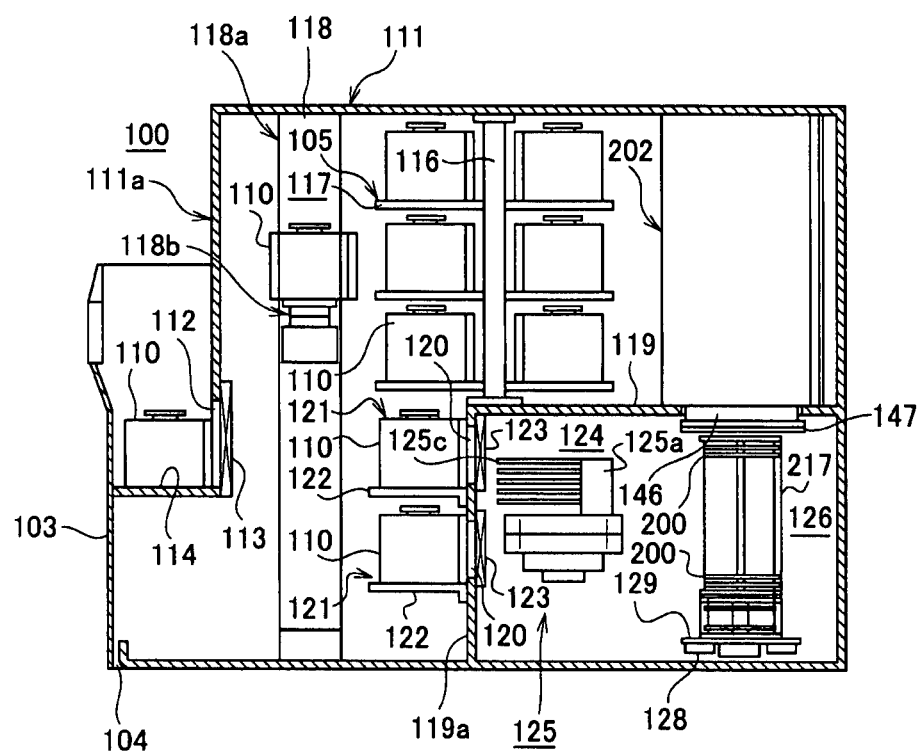
FIG. 7 is a side perspective view of the semiconductor processing apparatus showing an example of the substrate processing apparatus according to an embodiment of the present invention.
Figure 8:
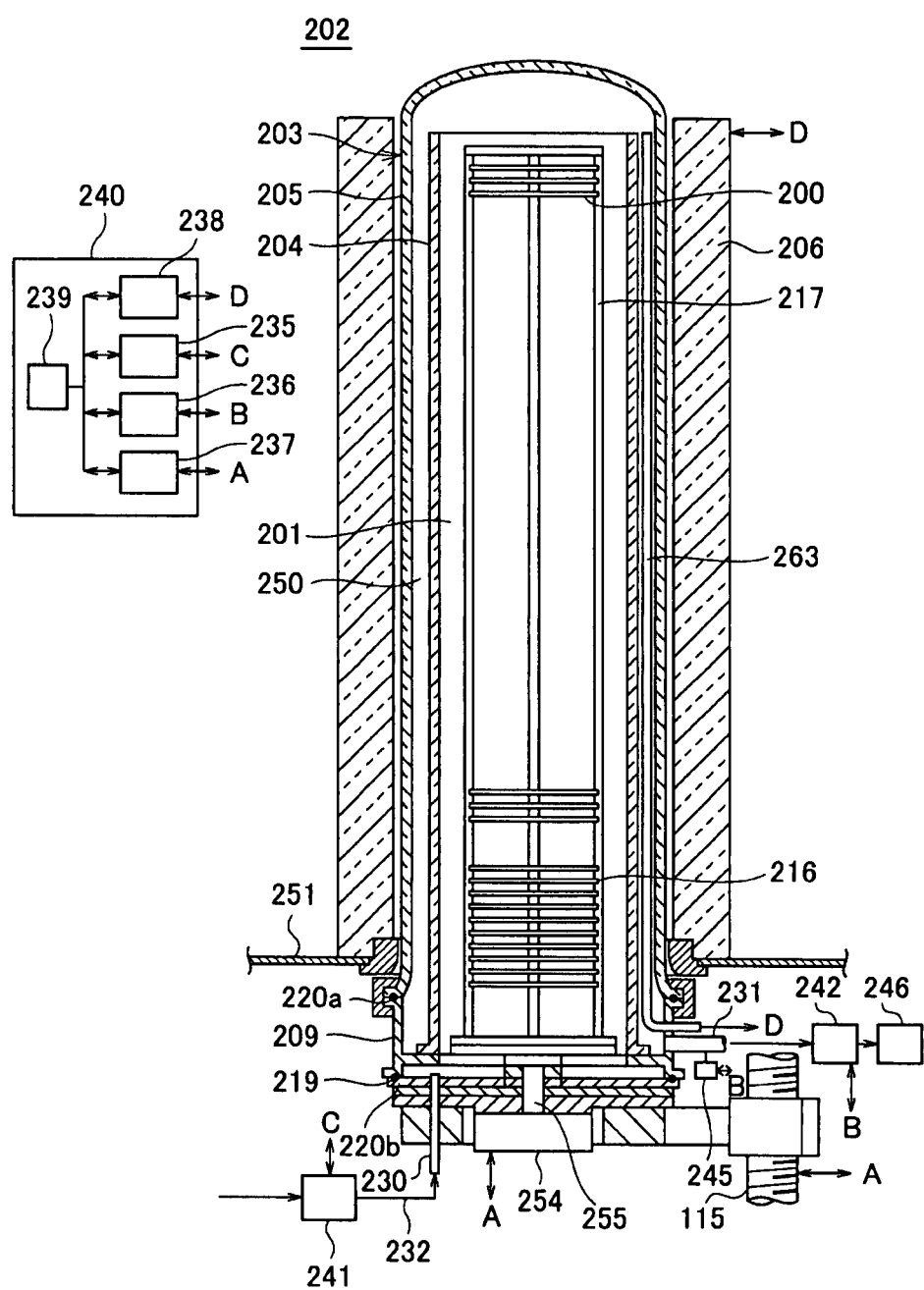
FIG. 8 is a vertical sectional view of a processing furnace of the semiconductor processing apparatus showing an example of the substrate processing apparatus according to an embodiment of the present invention.
Figure 9:
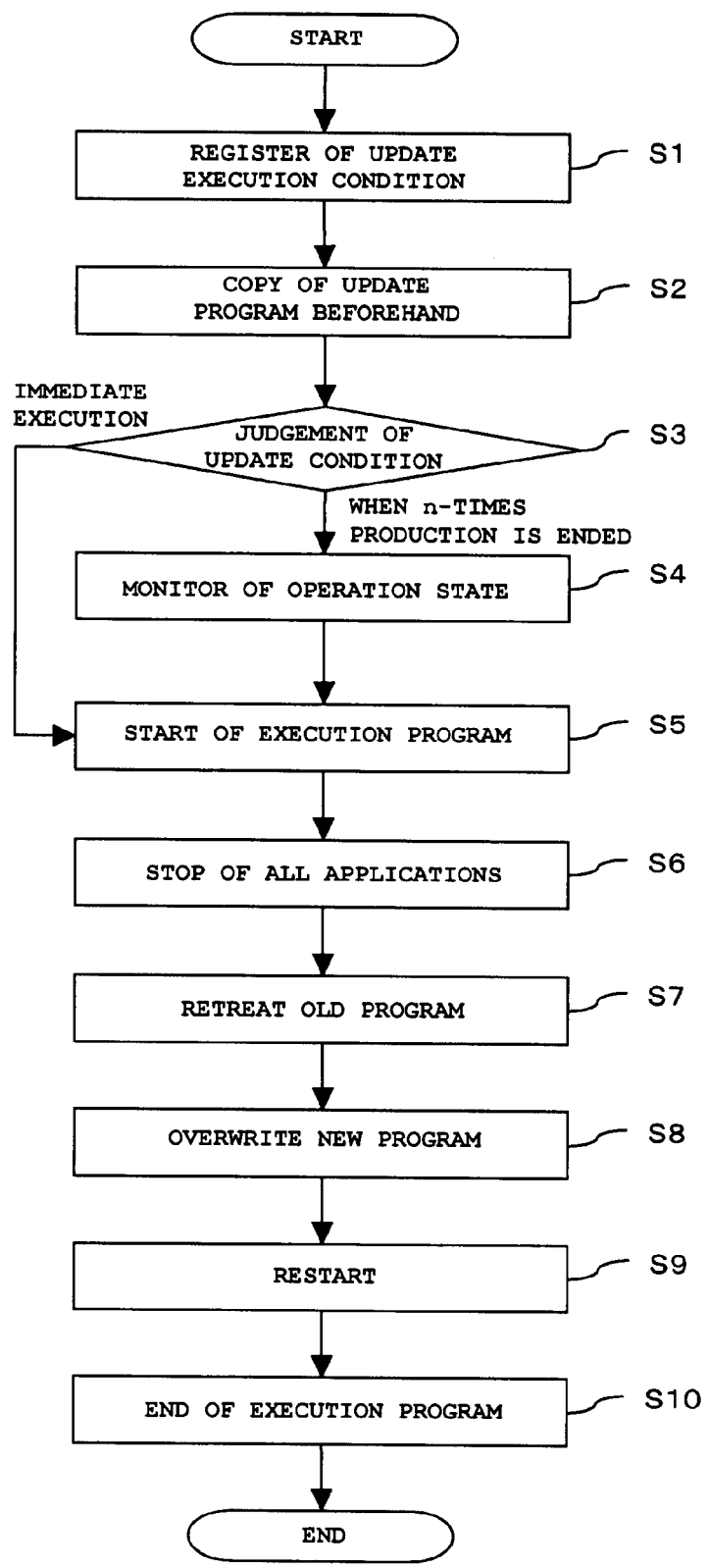
FIG. 9 is an operation flowchart of an update method of a program executed by a substrate processing system according to an embodiment of the present invention.

FIG. 1 is an outline constitutional view of the substrate processing system according to an embodiment of the present invention, FIG. 2 is a block diagram of the substrate processing apparatus according to an embodiment of the present invention, and FIG. 3 is a block diagram of a group management device according to an embodiment of the present invention. In addition, FIG. 4 is an outline view of a reservation screen of updating a program displayed in the group management device according to an example 1 of the present invention, FIG. 4A is an outline view of the reservation screen of the update program, FIG. 4B is an outline view of an update execution condition input screen, and FIG. 4C is an outline view of an update program input screen. In addition, FIG. 5 is an outline view of the reservation screen of updating the program displayed in the group management device according to an example 2 of the present invention, FIG. 5A is an outline view of the reservation screen for reserving the update of the program for a plurality of substrate processing apparatuses simultaneously, and FIG. 5B is an outline view of an update object device selection screen for selecting the substrate processing apparatus, being an update object. Also, FIG. 6 is a perspective view of the semiconductor processing apparatus showing an example of the substrate processing apparatus according to an embodiment of the present invention, FIG. 7 is a side face perspective view of the semiconductor processing apparatus showing an example of the substrate processing apparatus according to an embodiment of the present invention, and FIG. 8 is a vertical sectional view of a processing furnace of the semiconductor processing apparatus showing an example of the substrate processing apparatus according to an embodiment of the present invention. Then, FIG. 9 is an operation flowchart of an update method of the program executed by the substrate processing system according to an embodiment of the present invention. (1) Structure of the Substrate Processing System First, the structure of the substrate processing system according to an embodiment of the present invention will be explained by using FIG. 1.

As shown in FIG. 1, the substrate processing system according to an embodiment of the present invention includes at least one or more substrate processing apparatuses 10 that process the substrate; and a group management device 20 connected to each substrate processing apparatuses 10. Note that the substrate processing apparatus 10 and the group management device 20 may be directly connected by a communication cable, etc, or may be connected by a private line, or may be connected by a broad area line network such as Internet or a lease line network. (2) Structure of the Substrate Processing Apparatus As shown in FIG. 2, the substrate processing apparatus 10 according to an embodiment of the present invention includes a substrate processing system 100 that processes the substrate; a substrate processing apparatus controller 240 connected to the substrate processing system 100; and an operation terminal 240a connected to the substrate processing apparatus controller 240.

The structure and operation of the aforementioned substrate processing apparatus 100 will be explained by using FIG. 6 through FIG. 8. Thereafter, structures of the controller 240 of the substrate processing apparatus and the operation terminal 240a will be explained by using FIG. 2.

(2-1) Structure of the Substrate Processing System

The substrate processing system 100 according to this embodiment is constituted as a vertical apparatus that applies a substrate processing step such as oxidization processing, diffusion processing, and CVD processing to the substrate such as a wafer, as a manufacturing step of a semiconductor device (such as LSI or IC).

As shown in FIG. 6 and FIG. 7, the substrate processing system 100 according to this embodiment includes a casing 111. A front face maintenance opening 103 is provided as an opening part in front of the front face of a front face wall 111a of the casing 111 (at the left side of FIG. 7), as an opening part. In addition, two front face maintenance doors 104 are provided in the front face maintenance opening 103, so as to open/close the front face maintenance opening 103.

A pod 110 as a substrate containing vessel (called also a wafer carrier) is used for transporting the wafer 200 as the substrate to inside/outside the casing 111. The pod 110 is constituted to store a plurality of wafers 200 inside. A pod loading/unloading opening 112 is provided so as to communicate with inside/outside the casing 111, as a substrate container loading/unloading opening for transporting the pod 110 to the inside/outside the casing 111. The pod loading/unloading opening 112 is opened/closed by a front shutter 113 as an opening/closing mechanism.

A load port 114 as a substrate container transfer table is provided in front of the front face of the pod loading/unloading opening 112. The pod 110 is placed on the load port 114, so that the pod 110 can be aligned on the load port 114. The pod 110 is placed on the load port 114 and is unloaded from the load port 114 by an in-step transport device not shown.

A rotary pod shelf 105 as a substrate container placement shelf is provided in an upper space at a nearly central part in the front-rear direction (at a nearly central part in the casing 111 shown in FIG. 7). The rotary pod shelf 105 includes a prop 116 vertically provided so as to be rotatable in a horizontal surface, and a plurality of shelves 117 as substrate container placement tables. The plurality of shelves 117 are respectively constituted so as to be radially fixed to each position of upper, intermediate, lower stages in the prop 116 in a horizontal posture. In addition, a plurality of pods 110 are respectively placed on each shelf 117.

A pod transport device 118 as a substrate container transport device is provided between the load port 114 and the rotary pod shelf 105 in the casing 111. The pod transport device 118 includes a pod elevator 118a as a substrate container elevating mechanism to move the pod 110 in a state of being held, and a pod transport mechanism 118b as a substrate container transport mechanism to horizontally move the pod 110 in a sate of being held. By a cooperative operation of the pod elevator 118a and the pod transport mechanism 118b, the pod transport device 118 transports the pod 110 among the load port 114, the rotary pod shelf 105, and the placement table 122 as will be described later.

A sub-casing 119 is provided in a lower space in the casing 111, extending from a nearly central part to a rear end part in the casing 111. A pair of wafer loading/unloading openings 120 are provided in upper and lower stages on a front face wall 119a of the sub-casing 119 (at the central part side in the casing 111), as substrate loading/unloading opening for transporting the wafer 200 to the inside/outside the sub-casing 119. Pod openers 121 are provided in the wafer loading/unloading openings 120 of the upper and lower stages respectively. Each pod opener 121 includes a placement table 122 for placing the pod 110 thereon and a cap attaching/detaching mechanism 123 as a lid member attaching/detaching mechanism for attaching/detaching a cap, being a lid member of the pod 110. The pod opener 121 opens/closes a wafer loading/unloading opening of the pod 110 by attaching/detaching the cap of the pod 110 placed on the placement table 122 by the cap attaching/detaching mechanism 123.

A transfer chamber 124 is formed in the sub-casing 119. The transfer chamber 124 is constituted so as to be air-tightly shut off from other space in the casing 111 provided with the pod transport device 118 and the rotary pod shelf 105, etc. A wafer transfer mechanism 125 is provided in a front side area (at the central part side in the casing 111) in the transfer chamber 124. The wafer transfer mechanism 125 includes a wafer transfer device 125a as a substrate transfer device for placing the wafer 200 on the tweezer 125c as a substrate holding member and horizontally moving this wafer 200, and a wafer transfer device elevator 125b as a substrate transfer device elevating mechanism for moving the wafer transfer device 125a upward. By a cooperative operation of these wafer transfer device 125a and wafer transfer device elevator 125b, the wafer 200 can be charged into the boat 217 as a substrate holding tool as will be described later (charging), and the wafer 200 can be discharged from the boat 217 (discharging).

The boat 217 as the substrate holding tool is contained in a backside area in the transfer chamber 124 (at the rear end part in the casing 111), and a standby part 126 is constituted to make the boat standby. A constitution of the boat 217 will be explained later. A processing furnace 202 processing the substrate is provided in an upper side of the standby part 126. An opening is provided in the lower end part of the processing furnace 202, so as to communicate with the inside of the processing furnace 202 and the inside of the transfer chamber 124. The opening provided in the processing furnace 202 is adapted to be opened and closed by a shutter 147.

As shown in FIG. 6, a boat elevator 115 is provided in the inside of the casing 111, as a substrate holding tool elevating mechanism that moves the boat 217 upward. An arm 128 is provided in the lower end part of the boat elevator 115 as a connecting tool, and a seal cap 129 as a lid member is provided on the arm 128 in a horizontal posture. The seal cap 129 is adapted to vertically support the boat 217 from the lower side, and close the opening provided in the processing furnace 202 when the boat elevator 115 is elevated.

As shown in FIG. 6, a clean unit 134 is provided at a left side end part in the transfer chamber 124. The clean unit 134 has a supply fan and a dust prevention filter, and is adapted to supply clean gas or clean air 133, being inactive gas, into the transfer chamber 124. In addition, although not shown, a notch aligner 135 as a substrate aligning device to align the position in a peripheral direction of the wafer 200 is provided between the wafer transfer device 125a and the clean unit 134. Clean air 133 supplied into the transfer chamber 124 from the clean unit 134 passes through the periphery of the notch aligner 135, wafer transfer device 125a, and boat 217 provided in the standby part 126, and is sucked in a duct not shown. Then, the gas sucked in the duct is exhausted to the outside of the casing 111 or is circulated to a primary side, being a suction side of the clean unit 134 and is cleaned, and is supplied into the transfer chamber 124 again.

(2-2) Operation of the Substrate Processing System

Next, the substrate processing system 100 according to an embodiment of the present invention will be explained.

As shown in FIG. 6 and FIG. 7, when the pod 110 is placed on the load port 114, the front shutter 113 is moved to open the pod loading/unloading opening 112. Then, the pod 110 on the load port 114 is loaded into the casing 111 through the pod loading/unloading opening 112 by the pod transfer device 118. The pod 110 loaded into the casing 111 is directly stored or temporarily stored in a state of being placed on each shelf 117 of the rotary pod shelf 105, and thereafter is transferred onto the placement table 122 of either one of the upper or lower stage.

At this time, the wafer loading/unloading opening 120 of the pod opener 121 is closed by the cap attaching/detaching mechanism 123. In addition, the boat elevator 115 is set in a sate of being descended, and the opening of the lower end part of the processing furnace 202 is set in a state of being closed by the shutter 147. Further, the clean air 133 is supplied into the transfer chamber 124 by the clean unit 134. For example, by supplying nitrogen gas into the transfer chamber 124 as the clean air and filling the transfer chamber 124 with the nitrogen gas, oxygen concentration in the transfer chamber 124 is made significantly lower than that of other area in the casing 111.

The cap of the pod 110 placed on the placement table 122 is pressed against an opening edge part of the wafer loading/ unloading opening 120. Then, the cap is detached by the cap attaching/detaching mechanism 123, and the wafer charging/ discharging opening of the pod 110 is opened. Then, the wafer 200 in the pod 110 is picked up by the tweezer 125c of the wafer transfer device 125a, which is then loaded into the transfer chamber 124 through the wafer charging/discharging opening, then transferred to the standby part 126 formed on the rear part in the transfer chamber 124, with a direction along the periphery aligned by the notch aligner 135, and is charged into the boat 217 (charging). Thereafter, the same operation is repeated, and the wafer 200 remained in the pod 110 is charged into the boat 217.

Note that during the aforementioned operation, another pod 110 is transferred onto other placement table 122 from the rotary pod shelf 105. Then, the cap is detached by the cap attaching/detaching mechanism 123, and the wafer charging/ discharging opening of the pod 110 is opened.

When previously designated number of wafers 200 are charged into the boat 217 (charging), a throat shutter 147 horizontally moves to open the opening of the lower end part of the processing furnace 202. Subsequently, the boat elevator 115 is elevated, and the boat 217 holding a plurality of wafers 200 is loaded into the processing furnace 202, and the opening of the lower end part of the processing furnace 202 is air-tightly closed by the seal cap 219.

After the boat 217 is loaded into the processing furnace 202, an arbitrary processing is applied to the wafer 200 in the processing furnace 202. Such processing will be described later. Thereafter, by an almost opposite procedure to the aforementioned procedure excluding the step of aligning the direction along the periphery of the wafer 200 by the notch aligner 135, the pod 110 having processed wafers 200 stored therein is unloaded to the outside of the casing 111.

(2-3) Structure of the Processing Furnace

Subsequently, the structure of the aforementioned processing furnace 202 will be explained by using FIG. 8.

As shown in FIG. 8, the processing furnace 202 has a heater 206 as a heating mechanism. The heater 206 is formed in a cylinder shape, and is vertically installed in a state of being supported by a heater base 251 as a holding plate.

A process tube 203 is arranged in the heater 206 as a reaction tube, concentrically with the heater 206. The process tube 203 has an inner tube 204 as an internal reaction tube and an outer tube 205 as an external reaction tube provided outside of the inner tube 204. The inner tube 204 is formed of a heat resistant material such as quartz ($SiO_2$) or silicon carbide (SiC), and is formed in a cylinder shape, with an upper end and a lower end opened. The processing chamber 201 is formed inside of the inner tube 204. The boat 217 holding a plurality of wafers 200 is contained in the processing chamber 201. The outer tube 205 is formed of the heat resistant material such as quartz or silicon carbide, in a cylinder shape, with an inner diameter made larger than an outer diameter of the inner tube 204, the upper end closed and the lower end opened, and is provided concentrically with the inner tube 204.

A manifold 209 is provided concentrically with the outer tube 205, in a lower part of the outer tube 205. The manifold 209 is, for example, formed of stainless and is formed in a cylinder shape, with the upper end and the lower end opened. The manifold 209 is joined to the lower end part of the inner tube 204 and the lower end part of the outer tube 205, to support them. Note that an O-ring 220a as a seal member is provided between the manifold 209 and the outer tube 205. The process tube 203 is vertically installed, when the manifold 209 is supported by the heater base 251. A reaction vessel is formed by the process tube 203 and the manifold 209.

The boat 217 as the substrate holding tool holds a plurality of wafers 200 of about 50 to 125, arranged in a vertical direction, in a horizontal posture, with the center mutually aligned. The boat 217 is, for example, formed of the heat resistant material such as quartz or silicon carbide. In addition, a plurality of disc-shaped heat insulating plates 216 are arranged in a lower part of the boat 217 in multiple stages in a horizontal posture, as heat insulating members formed of the heat resistant material such as quartz or silicon carbide, so as to suppress heat conduction to the manifold 209 side from the heater 206.

As described above, the seal cap 219 is provided as a lid member in the lower part of the manifold 209 (in the lower part of the processing furnace 202). The seal cap 219 vertically supports the boat 217 from downside and air-tightly closes the lower end opening part of the manifold 209 when the boat elevator 115 is elevated. The seal cap 219 is, for example, formed of metal such as stainless, and is formed in a disc shape. An O-ring 220b as the seal member is provided between an upper surface of the seal cap 219 and a lower end of the manifold 209. A rotation mechanism 254 for rotating the boat 217 is provided on the lower surface side of the seal cap 219 (on the opposite side to the processing chamber 201). A rotation shaft 255 of the rotation mechanism 254 penetrates the seal cap 219 and supports the lower end part of the boat 217, so that the wafer 200 can be rotated by rotating the boat 217. In addition, as described above, the seal cap 219 is vertically elevated by the boat elevator 115 as a substrate holding tool elevating mechanism provided in the lower part of the process tube 203. Thus, the boat 217 can be transferred to inside and outside of the processing chamber 201. A drive controller 237 is electrically connected to the rotation mechanism 254 and the boat elevator 115. The rotation mechanism 254 and the boat elevator 115 are controlled by the drive controller 237 to perform a desired operation at a desired timing.

A nozzle 230 as a gas introduction part is connected to the seal cap 219, so as to be communicated with the inside of the processing chamber 201. A gas supply tube 232 is connected to an upstream side end part of the nozzle 230. A processing gas supply source and an inactive gas supply source not shown are connected to the upstream side of the gas supply tube 232 (opposite side to a connection side to the nozzle 230) through a MFC (mass flow controller) 241 as the gas flow controller. A gas flow controller 235 is electrically connected to the MFC 241. The MFC 241 is controlled by the gas flow controller 235 so that a flow rate of the gas supplied into the processing chamber 201 is a desired amount at a desired timing.

An exhaust tube 231 that exhausts an atmosphere in the processing chamber 201 is provided in the manifold 209. The exhaust tube 231 is disposed on the lower end part of a cylindrical space 250 formed by a gap between the inner tube 204 and the outer tube 205, and is communicated with the inside of the cylindrical space 250. A vacuum exhaust device 246 is connected to the lower stream side of the exhaust tube 231 (on the opposite side to the connection side to the manifold 209) through a pressure sensor 245 as a pressure detection unit and a pressure adjustment device 242. In addition, a pressure controller 236 is electrically connected to the pressure adjustment device 242 and the pressure sensor 245. Then, by feedback-controlling the operation of the pressure adjustment device 242 by the pressure controller 236 based on a pressure detected by the pressure sensor 245, while operating the vacuum exhaust device 246, the pressure in the processing chamber 201 is set to a desired pressure at a desired timing.

A temperature sensor 263 as a temperature detecting unit is provided in the process tube 203. A temperature controller 238 is electrically connected to the heater 206 and the temperature sensor 263. Based on temperature information detected by the temperature sensor 263, the temperature controller 238 feedback-controls power supply amount to the heater 206, thus making it possible to set the temperature inside the processing chamber 201 to be a desired temperature distribution at a desired timing.

The gas flow controller 235, the pressure controller 236, the drive controller 237, the temperature controller 238 are electrically controlled by a main controller 239 that controls an entire body of the substrate processing apparatus 10. These gas flow controller 235, pressure controller 236, drive controller 237, temperature controller 238, and main controller 239 are constituted as a substrate processing apparatus controller 240. The structure and operation of the substrate processing apparatus controller 240 will be described later.

(2-4) Substrate Processing Step

Subsequently, explanation will be given to a substrate processing step of forming a thin film on the wafer 200 by the CVD method, for example, as a step in the manufacturing step of the semiconductor device. Note that the substrate processing step according to this embodiment is executed by the substrate processing apparatus 10 including the aforementioned substrate processing system 100. In addition, in the explanation given hereunder, the operation of each part constituting the substrate processing apparatus 10 is controlled by the substrate processing apparatus controller 240.

First, the boat elevator 115 is elevated and the boat 217 holding a plurality of wafers 200 is loaded into the processing chamber 201 (boat loading). As a result, the lower end of the manifold 209 is set in a state of being air-tightly closed by the seal cap 219.

Subsequently, the inside of the processing chamber 201 is vacuum-exhausted by the vacuum exhaust device 246, so that the inside of the processing chamber 201 is set to be a desired pressure. At this time, the pressure controller 236 feedback-controls the operation of the pressure adjustment device 242 based on the pressure detected by the pressure sensor 245, while operating the vacuum exhaust device 246. In addition, the inside of the processing chamber 201 is heated by the heater 206, so that the inside of the processing chamber 201 has a desired temperature distribution. At this time, based on the temperature information detected by the temperature sensor 263, the power supply amount to the heater 206 is feedback-controlled by the temperature controller 238. Subsequently, by operating (rotating) the rotation mechanism 254, the boat 217 and the wafer 200 are rotated.

Subsequently, the processing gas from the processing gas supply source is supplied (introduced) into the processing chamber 201 through the gas supply tube 232 and the nozzle 230, while controlling the flow rate by the MFC 241. The processing gas supplied into the processing chamber 201 drifts upward in the processing chamber 201, flows out to the cylinder space 250 from the upper end opening, and is exhausted from the exhaust tube 231. As a result, when passing through the inside of the processing chamber 201, the processing gas is brought into contact with the surface of the wafer 200, to allow a thermal CVD reaction to occur, and a thin film is deposited on the surface of the wafer 200 (deposition).

When a previously set processing time is elapsed, supply of the processing gas into the processing chamber 201 is stopped. Then, while controlling the flow rate by the MFC 241, the inactive gas from the inactive gas supply source is supplied (introduced) into the processing chamber 201 through the gas supply tube 232 and the nozzle 230. As a result, residual gas in the processing chamber 201 is replaced with the inactive gas, and the pressure in the processing chamber 201 is returned to a normal pressure.

Thereafter, the boat elevator 115 is descended, the lower end part of the manifold 209 is opened, and the boat 217 holding the processed wafer 200 is unloaded to the outside of the processing chamber 201 (boat unloading), and the aforementioned substrate processing step is ended. Thereafter, the processed wafer 200 is taken out from the boat 217 (wafer discharge), then is stored in the pod 110, and is unloaded to the outside of the casing 111.

(2-5) Structure of the Controller for the Substrate Processing Apparatus

Subsequently, a block structure of the substrate processing apparatus controller 240 provided in the substrate processing apparatus 10 according to an embodiment of the present invention will be explained by using FIG. 2.

As described above, the substrate processing apparatus controller 240 includes the main controller 239 that controls the entire body of the substrate processing apparatus 10, and each controller that controls the substrate processing system 100 (the gas flow controller 235, pressure controller 236, drive controller 237, temperature controller 238). The main controller 239 and each controller 235 to 238 are electrically connected, in a state possible to mutually perform data exchange.

The main controller 239 includes a CPU 239a as a central calculation unit, a memory 239b, an external storage device 239c having a reading function of a recording medium such as a CD-ROM or FD, a communication port 239d, and a storage device 239e such as an HDD. Each constitutional component as described above is constituted, so that data exchange can be mutually performed through an internal bus.

The communication port 239d is connected to the group management device 20 through a network, etc. Thus, data exchange between the substrate processing apparatus 10 and the group management device 20 can be performed.

An execution application area 239f storing each kind of application program is provided in the storage device 239e. Each kind of application program stored in the execution application area 239f is read in the memory 239b from the storage device 239e, and is executed by the CPU 239a to cause the substrate processing apparatus controller 240 to realize various functions.

In addition, an update preparation area 239g is provided in the storage device 239e, so as to store a new program (update program), being an update object. The update program is transmitted to the substrate processing apparatus controller 240 from the group management device controller 21 provided in the group management device 20. The substrate processing apparatus controller 240 receives the update program through the communication port 239d, and stores it in the update preparation area 239g. In addition, the substrate processing apparatus controller 240 overwrites and copies an update program group stored in the update preparation area 239g in the execution application area 239f, when the update execution program 239i as will be described later is executed.

The reservation information of updating the program can be stored in the update preparation area 239g. As will be described later, the reservation information of update can be transmitted to the substrate processing apparatus controller 240 from the group management device controller 21 provided in the group management device 20. The substrate processing apparatus controller 240 receives the reservation information of update through the communication port 239d, and stores it in the update preparation area 239g. The reservation information stored in the update preparation area 239g can be read by the update execution program 239i as will be described later.

In addition, a retreat area 239h of old version is provided in the storage device 239e. The retreat area 239h of old version is used as a retreat area for retreating (storing) each kind of application program of old version used just before update. Namely, the substrate processing apparatus controller 240 is constituted so as to copy and retreat an update program group of old version stored in the execution application area 239f into the old version retreat area 239h, when the update execution program 239i as will be described later is executed.

In addition, the update execution program 239i for updating each kind of application program stored in the execution application area 239f is stored in the storage device 239e. The update execution program 239i is started responding to an instruction to execute update given from the group management device 20. The instruction to execute update is transmitted from the group management device 20 to the substrate processing apparatus controller 240 as will be described later. The substrate processing apparatus controller 240 receives the instruction to execute update through the communication port 239d, reads the update execution program 239i from the storage device 239e, and makes the CPU 239a execute this program. Then, each kind of the application program of the update execution program 239i is updated by the substrate processing apparatus controller 240. Such an operation will be described later.

(2-6) Structure of the Operation Terminal

The operation terminal 240a is connected to the main controller 239, and is constituted as an input/output device used for operating the substrate processing apparatus 10 by a maintenance person. The operation terminal 240a has a touch panel 240b, and a state of the substrate processing apparatus 10 is displayed on the touch panel 240b and a touch key is displayed thereon for performing each kind of operation to the substrate processing apparatus 10 by the maintenance person. Note that the operation terminal 240a of the present invention is not limited to a structure including the touch panel 240b but may have a keyboard device as an input device and a display device as an output device separately. (3) Structure of the Group Management Device Subsequently, the structure of the group management device 20 of the substrate processing system according to an embodiment of the present invention will be explained by using FIG. 3. The group management device 20 includes a group management device controller 21 and an operation terminal 22.

(3-1) Structure of the Group Management Device Controller

The group management device controller 21 includes a CPU 21a as a central processing unit, a memory 21b, an external storage device 21c having a reading function of a recording medium such as CD-ROM or FD, a communication port 21d, and a storage device 21e such as a HDD. Each kind of such constituent component is constituted so as to mutually perform data exchange through an internal bus.

The communication port 21d is connected to the substrate processing apparatus controller 240 of the substrate processing apparatus 10 via a network, etc. Thus, the data exchange is possible between the substrate processing apparatus 10 and the group management device 20.

An execution application area 21f, in which each kind of application program is stored, is provided in the storage device 21e. Each kind of program stored in the execution application area 21f is read in the memory 21b from the storage device 21e, executed by the CPU 21a, so that various functions are realized by the group management device controller 21.

In addition, an update reservation information area 21g storing the reservation information of updating the program, is provided in the storage device 21e. The content of the reservation information of updating the program is suitably determined according to an operation of the operation terminal 22 by the maintenance person, temporarily held in the memory 21b, then stored in the update reservation information area 21g of the storage device 21e and can be transmitted to the substrate processing apparatus 10 through the communication port 21d.

In addition, an update program storage area 21h storing a new application program (update program) of the substrate processing apparatus 10, being an update object, is provided in the storage device 21e. The update program is previously stored in the recording medium such as CD-ROM, FD, and memory stick, and is read from the external storage device 21c by the operation of the maintenance person, and is stored (copied) in the update program storage area 21h of the storage device 21e. Further, the update program stored (copied) in the update program storage area 21h is transmitted to the substrate processing apparatus 10 through the communication port 21d.

(3-2) Structure of the Operation Terminal

The operation terminal 22 is connected to the group management device controller 21, and is constituted as the input/output device used for operating the group management device 20 by the maintenance person. The operation terminal 22 includes a touch panel 22a and the touch panel 22a displays various data input stand-by screens and displays the touch key for performing each kind of operation to the group management device 20 by the maintenance person. Note that the operation terminal 22 of the present invention is not limited to a structure including the touch panel 22a as the input/output device but may include the keyboard device as the input device, and the display device as the output device, separately. (4) Operation of the Substrate Processing System Subsequently, a series of the aforementioned substrate processing system will be explained with reference to FIG. 9. Note that in the explanation given hereunder, the function of the group management device controller 21 is realized by each kind of application program stored in the storage device 21e. Namely, each kind of application program stored in the storage device 21e is read by the memory 21b, which is then executed by the CPU 21a, so that various functions as will be described later are realized by the group management device controller 21. Also, similarly, the function of the substrate processing apparatus controller 240 is realized by the update execution program 239i and each kind of application program stored in the storage device 239e. Namely, the update execution program 239i and each kind of application program stored in the storage device 239e are read and executed by the CPU 239a, so that various functions as will be described later are realized by the substrate processing apparatus controller 240.

(4-1) Register Step of Update Execution Condition (S1)

First, the reservation information of updating the program showing an update execution condition is inputted in the group management device controller 21. Specifically, under the control of the group management device controller 21, an input stand-by screen regarding an execution condition of update program is displayed on the touch panel 22a of the operation terminal 22. Meanwhile, the maintenance person operates the touch panel 22a and inputs report message showing "the program is updated when production processing of n-number of times is ended" or "the program is updated instantly", as the reservation information of updating the program. The reservation information of update inputted by the maintenance person is stored in the update reservation information area 21g of the storage device 21e.

(4-2) Preliminary Copying Step of Update Program (S2)

Subsequently, under the control of the group management device controller 21, a selection screen of a new program, being an update object, (selection screen of the update program) is displayed on the touch panel 22a of the operation terminal 22. Meanwhile, the maintenance person operates the touch panel 22a and selects the kind of the program, being the update object, and its version, etc. When the program, being the update object, is selected (namely, when the information specifying the update program is inputted), the group management device controller 21 reads the program (specified update program) selected from the recording medium such as CD-ROM or FD, by using the external storage device 21c, stores (copies) it in the update program storage area 21h of the storage device 21e, and transmits it to the substrate processing apparatus 10 through the communication port 21d. The transmitted update program is received by the substrate processing apparatus controller 240, and is stored in the update preparation area 239g of the storage device 230e.

(4-3) Judgment Step of Update Condition (S3)

Thereafter, the group management device controller 21 executes judgment processing based on the reservation information of update stored in the update reservation information area 21g. Specifically, if the inputted reservation information is, for example, "the program is updated when the production processing of n-number of times is ended", the group management device controller 21 initializes a production processing number counter (sets a counter value at zero) of the group management device controller 21, and executes a monitor step (S4) of an operation state as will be described later. In addition, if the inputted reservation information of update is, for example, "the program is updated instantly", the monitor step (S4) of the operation state is not executed and a starting step (S5) of the update execution program as will be described later is instantly executed.

(4-4) Monitor Step of the Operation Step (S4)

The group management device controller 21 that initializes the production processing number counter monitors the operation state of the substrate processing apparatus 10 (such as start of production processing and end of production processing) through the communication port 21d. Such a monitor may be performed by transmitting an inquiry message regularly to the substrate processing apparatus 10 from the group management device 20, or may be performed by receiving a response message from the substrate processing apparatus 10 by the group management device 20, or may be performed by receiving a processing end message (trap) voluntarily transmitted from the substrate processing apparatus 10. Then, when the end of the production processing of the substrate processing apparatus 10 is detected, a value of the production processing number counter is updated and the value of the present production processing number counter and the production processing number of times (namely, the aforementioned "n") designated by the reservation information are compared. Then, when the production processing number counter shows the production processing number of times (n) or more designated by the reservation information, the starting step (S5) of the update execution program as will be described later is executed. Meanwhile, when the production processing number counter shows the production processing number of times of under (n), the monitor step (S4) of the operation state is continued.

(4-5) Starting Step of the Update Execution Program (S5)

When the inputted reservation information of update shows "the program is updated instantly", or when the value of the production processing number counter is more than the designated production processing number of times (n), the group management device controller 21 transmits the instruction to the substrate processing apparatus 10 so as to execute updating of the program. Then, the substrate processing apparatus controller 240 receives the instruction to execute updating the program through the communication port 239d, reads the update execution program 239i from the storage device 239e to the memory 239b, and makes the CPU 239a execute this program.

(4-6) Stopping Step of all Application Programs (S6)

Thereafter, the substrate processing apparatus controller 240 stops the application program (old application program), being the update object, during execution. However, at this time, the update execution program 239i is not stopped.

(4-7) Retreat Step of the Old Application Program (S7)

Thereafter, under the control of the substrate processing apparatus controller 240, all application programs stored in the execution application area 239f of the storage device 239e is copied (retreated) into the old version retreat area 239h.

(4-7) Overwriting Step of a New Program (S8)

Thereafter, under the control of the substrate processing apparatus controller 240, the update program stored in the update preparation area 239g of the storage device 239e is overwritten and copied into the execution application area 239f.

(4-8) Restarting Step of all Application Programs (S9)

Thereafter, the substrate processing apparatus controller 240 restarts the update program stored in the execution application area 239f of the storage device 239e.

(4-9) Finishing Step of the Update Execution Program (S10)

When the start of the update program is successful, the substrate apparatus controller 240 ends the update execution program 239i. Note that when restart of the application program (namely, the update program) fails, the substrate processing apparatus controller 240 overwrites and copies all application programs (including old application program) retreated in the old version retreat area 239h into the execution application area 239f, starts these application programs, and may restore the substrate processing apparatus 10. (5) Advantage by an Embodiment of the Present Invention According to an embodiment of the present invention, update of the program of the substrate processing apparatus 10 can be automatically executed, only by performing a reservation work of updating the program to the substrate processing apparatus from the group management device 20, without confirming an operation plan of the substrate processing apparatus by the maintenance person.

EXAMPLE 1

An example 1 of the present invention will be explained hereunder. Under the control of the group management device controller 21 according to this example, a reservation screen 23 of an updated program shown in FIG. 4A is displayed on the touch panel 22a of the operation terminal 22.

Then, by touching an input column 23a of "update execution condition" by the maintenance person, an update execution condition input screen 24 shown in FIG. 4B is displayed on the touch panel 22a. Then, by touching a button 24a of "at finishing time of times production processing of n-number of times" by the maintenance person, a value input keyboard 24b is displayed on the touch panel 22a. Then, by touching an arbitrary value key of the input keyboard 24b by the maintenance person, the value of the aforementioned "n" can be designated (inputted). Also, by touching a button 24c of "execute instantly" by the maintenance person, the execution condition for executing the update work of the execution program instantly is designated (inputted), irrespective of a state of the substrate processing apparatus 10.

In addition, by touching an input column 23b of the "update program" by the maintenance person, an update program input screen 25 shown in FIG. 4C is displayed on the touch panel 22a. Then, by selecting any one of version out of a plurality of version groups displayed on the update program input screen 25 and further touching a button 25b of "setting", the version of the update program is designated (inputted).

According to the example 1, update can be automatically performed, only by performing the reservation work of updating the program to the substrate processing apparatus 10 from the touch panel 22a, without confirming the operation plan of the substrate processing apparatus 10 by the maintenance person.

EXAMPLE 2

Subsequently, an example 2 of the present invention will be explained. Under the control of the group management device controller 21 according to this example, a reservation screen 26 for updating the program shown in FIG. 5A is displayed on the touch panel 22a of the operation terminal 22.

The kind of the update program is sometimes different, depending on the kind of the substrate processing apparatus 10, for example. Therefore, in this example, by touching a selection column 26a of "No" by the maintenance person, the kind of the update program can be designated (inputted). Designation (input) of the kind of the update program can be easily performed by using numbers (such as 1 to 10) assigned to each kind of the program.

Then, by touching a selection column 26b of "update program" by the maintenance person, the version of each update program can be designated (inputted).

Then, by touching a selection column 26c of "update execution condition" by the maintenance person, the execution condition of each update program (for example, conditions such as "at finishing time of production processing of n-number of times" or "execute instantly") can be designated (inputted).

Then, by touching a selection column 26d of "update object device" by the maintenance person, the substrate processing apparatus 10 for updating programs can be designated (inputted). Note that designation (input) of the substrate processing apparatus 10 can be easily performed by using an update object device selection screen 26h shown in FIG. 5B. In addition, as shown in FIG. 5B, a plurality of substrate processing apparatuses 10 can be simultaneously designated (inputted).

In some cases, several tens to several hundred of semiconductor manufacturing devices are installed in some semiconductor manufacturing factories. If it is so assumed that there are 100 substrate processing apparatuses and reservation of updating the program is performed to each substrate processing apparatus 10 one by one, 17 hours in total is required when a reservation working time per one substrate processing apparatus is set at 10 minutes. Meanwhile, according to this example, the reservation of updating program can be simultaneously performed to a plurality of substrate processing apparatuses 10, thus making it possible to largely reduce a load of the maintenance person.

EXAMPLE 3

Figure 10:
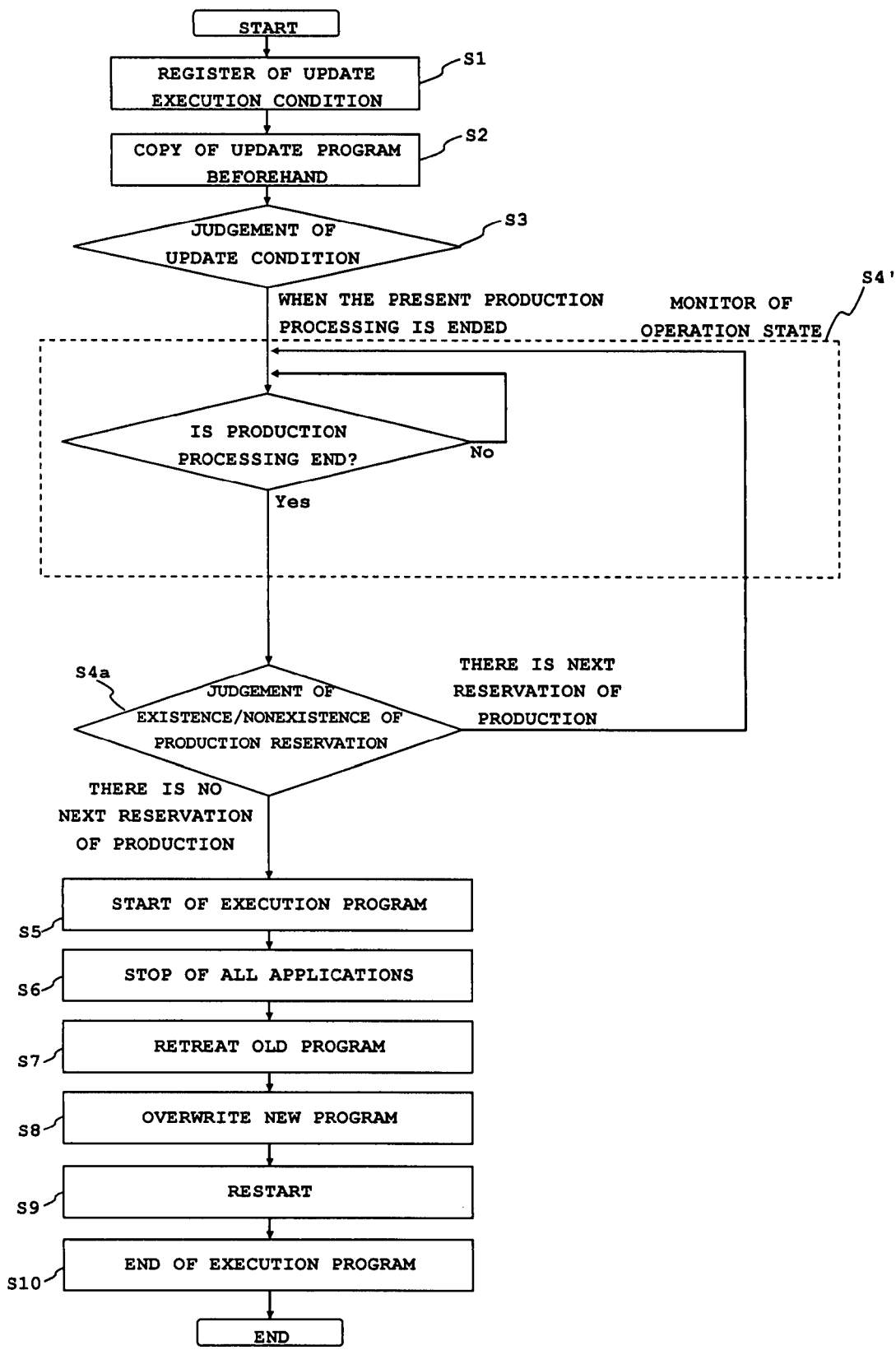
FIG. 10 is an operation flowchart of the update method of the program executed by the substrate processing system according to an example 3 of the present invention.

Subsequently, an example 3 of the present invention will be explained with reference to FIG. 10. FIG. 10 is an operation flowchart of an update method of the program executed by the substrate processing system according to the example 3 of the present invention. The substrate processing system according to this example can instantly update the program at the finishing time of the production processing, being executed at present, and when there is no next production reservation, and this is a different point from the aforementioned example.

Specifically, in a registering step of the update execution condition (S1), the maintenance person operates the touch panel 22a and inputs the report message showing "the program is instantly updated at the finishing time of the present production processing and when there is no next production reservation", as the reservation information of updating program. In the same way as the aforementioned examples, the reservation information of update inputted by the maintenance person is stored in the update reservation information area 21g of the storage device 21e.

Then, after executing the preliminary copying step of the update program (S2), the group management device controller 21 executes a judgment step (S3) of the update condition and when the reservation information of update stored in the update reservation information area 21g shows the report message showing "the program is instantly updated at the finishing time of the present production processing and when there is no next production reservation", the group management device controller 21 executes the monitoring step (S4') of the operation state sown below.

In the monitoring step of the operation state (S4'), the group management device controller 21 monitors the operation state (whether or not the production processing is finished) of the substrate processing apparatus 10 through the communication port 21d. In addition, when the production processing, being performed at present, is finished, the group management device controller 21 instantly executes the judgment step (S4a) of existence/non-existence of the production reservation. Note that in this example, the group management device controller 21 does not update the value of the production processing number counter.

In the judgment step of the existence/non-existence of the production reservation (S4a), the group management device controller 21 collects from the substrate processing apparatus 10 the information regarding the existence/non-existence of the next production reservation, and when there is no next production reservation, the program is updated and when there is the next production reservation, waits until there is no next production reservation.

Specifically, the group management device controller 21 transmits a response request message to the substrate processing apparatus controller 240 through the communication port 21d. The substrate processing apparatus controller 240 receives the response request message through the communication port 239d, and reads the production plan previously recorded in the storage device 239e. Then, the substrate processing apparatus controller 240 prepares a response message showing "there is the reservation of the next production plan" or "there is no reservation of the next production plan", and transmits such a response message to the group management device controller 21 through the communication port 239d. The group management device controller 21 receives the response message through the communication port 39d, and when the content of the response message shows "there is no next production reservation", executes the aforementioned steps S5 to S10 to update the program, and when the response message shows "there is the next production reservation", repeatedly executes the monitoring step (S4) of the operation state, thereby waiting until there is no next production reservation.

Generally, there are many cases that the restart of the program of the substrate processing apparatus 10 is finished for a short period of time, and can be executed in many cases in a vacant time until the next production processing is started. In such a case, it is effective sometimes to update the program, without waiting for the end of the production processing of n-number of times. According to this example, the program can be instantly updated without waiting for the end of the production processing of n-number of times.

EXAMPLE 4

Figure 11:
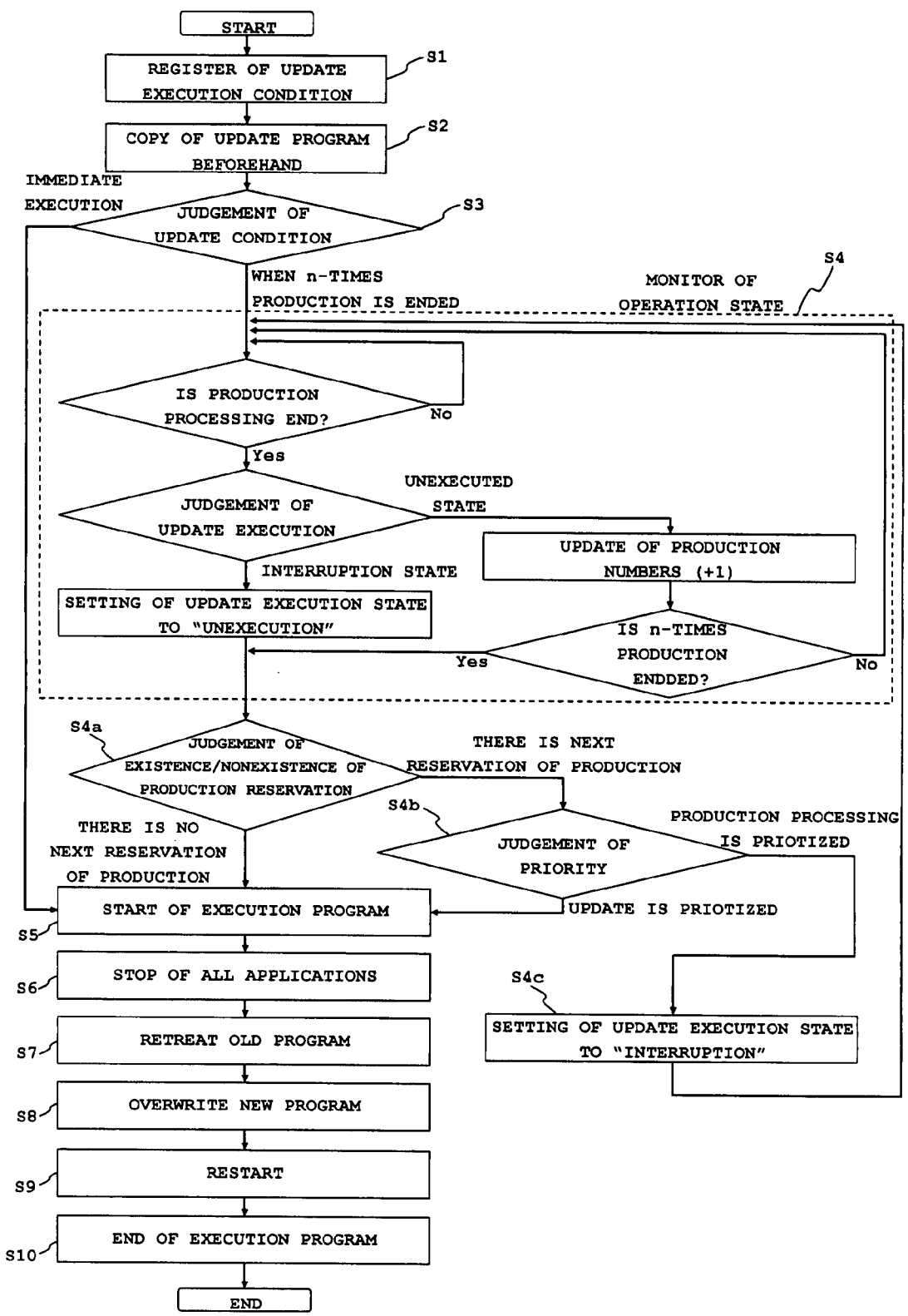
FIG. 11 is an operation flowchart of the update method of the program executed by the substrate processing system according to an example 4 of the present invention.

Subsequently, an example 4 of the present invention will be explained with reference to FIG. 11. FIG. 11 is an operation flowchart of the update method of the program executed by the substrate processing system according to the example 2 of the present invention. The substrate processing system according to this example is different from the aforementioned example in the point that the program is updated at the finishing time of the production processing of n-number of times and when there is no next production reservation. In addition, the substrate processing system according to this example is different from the aforementioned example in the point that update of the program is prioritized over the production processing even when there is the next production reservation.

Specifically, in the registering step of the update execution condition (S1), the maintenance person operates the touch panel 22a and inputs the report message showing "the program is updated at the finishing time of the production processing of n-number of times" and priority report message showing "whether or not the update of the program is prioritized over the next production processing", as the reservation information of updating the program. In the same way as the aforementioned examples, the reservation information thus inputted by the maintenance person is stored in the update reservation information area 21g of the storage device 21e.

Then, after executing the preliminary copying step of the update program (S2), the group management device controller 21 executes the judgment step of the update condition (S3). Namely, when the reservation information of update stored in the update reservation information area 21g shows "the program is instantly updated at the finishing time of the present production processing and when there is no next production reservation", the group management device controller 21 initializes the production processing number counter of the group management device controller 21 (sets the counter value at zero) and initializes an update execution state flag (sets the value of the update execution state flag in an "unexecuted state"), and executes the monitoring step (S4) of the operation state as will be described later.

In the monitoring step (S4) of the operation state according to this example, the operation state (such as start of the production processing and end of the production processing) of the substrate processing apparatus 10 is monitored and the value of a production processing number counter and the value of the update execution state flag are operated. Namely, the group management device controller 21 that initializes the production processing number counter and the update execution state flag monitors the operation state of the substrate processing apparatus 10 thorough the communication port 21d. Then, when the end of the production processing is detected, judgment of the update execution state flag is performed. Then, when the value of the update execution state flag is set in "unexecuted state", the value of the production processing number counter is updated and the value of the present production processing number counter and the number of times (such as the aforementioned "n") of the production processing designated by the reservation information are compared. Then, when the value of the production processing number counter is more than the number of times (n) of the production processing designated by the reservation information, the judgment step (S4a) of the existence/non-existence of the production reservation as will be described later is executed. In addition, when the value of the update execution state flag is an "interruption state", the value of the update execution state flag is rewritten to "unexecuted" and thereafter the judgment step (S4a) of the existence/non-existence of the production reservation as will be described later is executed.

In the judgment step (S4a) of the existence/non-existence of the production reservation, the group management device controller 21 collects from the substrate processing apparatus 10 the information regarding the existence/non-existence of the next production reservation in the same way as the aforementioned examples, and when there is no next production reservation, executes the aforementioned steps of S5 to SS10, to update the program. However, when there is the next production reservation, unlike the aforementioned example, a priority judgment step (S4d) shown below is executed.

In the priority judgment step (S4d), the group management device controller 21 judges the priority of the processing. Namely, the group device controller 21 judges which of the update of the program or the next production processing is prioritized. Specifically, priority information stored in the update reservation information area 21g of the storage device 21e is read and when such priority information shows "the update of the program should be prioritized", executes the aforementioned steps S5 to S10 to update the program, and when such priority information shows "the production processing should be prioritized", rewrites the value of the update execution state flag to "interruption", and waits until there is no next production reservation by repeatedly executing the monitoring step (S4) of the operation state.

The update of the program should be more preferentially executed than the operation plan (existence/non-existence of the reservation of the next production processing) in some cases, depending on its purpose. For example, generally update work for preventing firing and preventing damage of the substrate processing apparatus should be prioritized over the operation plan. Meanwhile, in some cases, the operation plan (production processing) is prioritized over the update work which is performed for the purpose of adding a new function to the substrate processing apparatus 10 or coping with a minor bug. According to this example, the priority of the update work of the program is set for each program, and according to the set priority, the update of the program can be prioritized over the next production processing.

EXAMPLE 5

Figure 13:
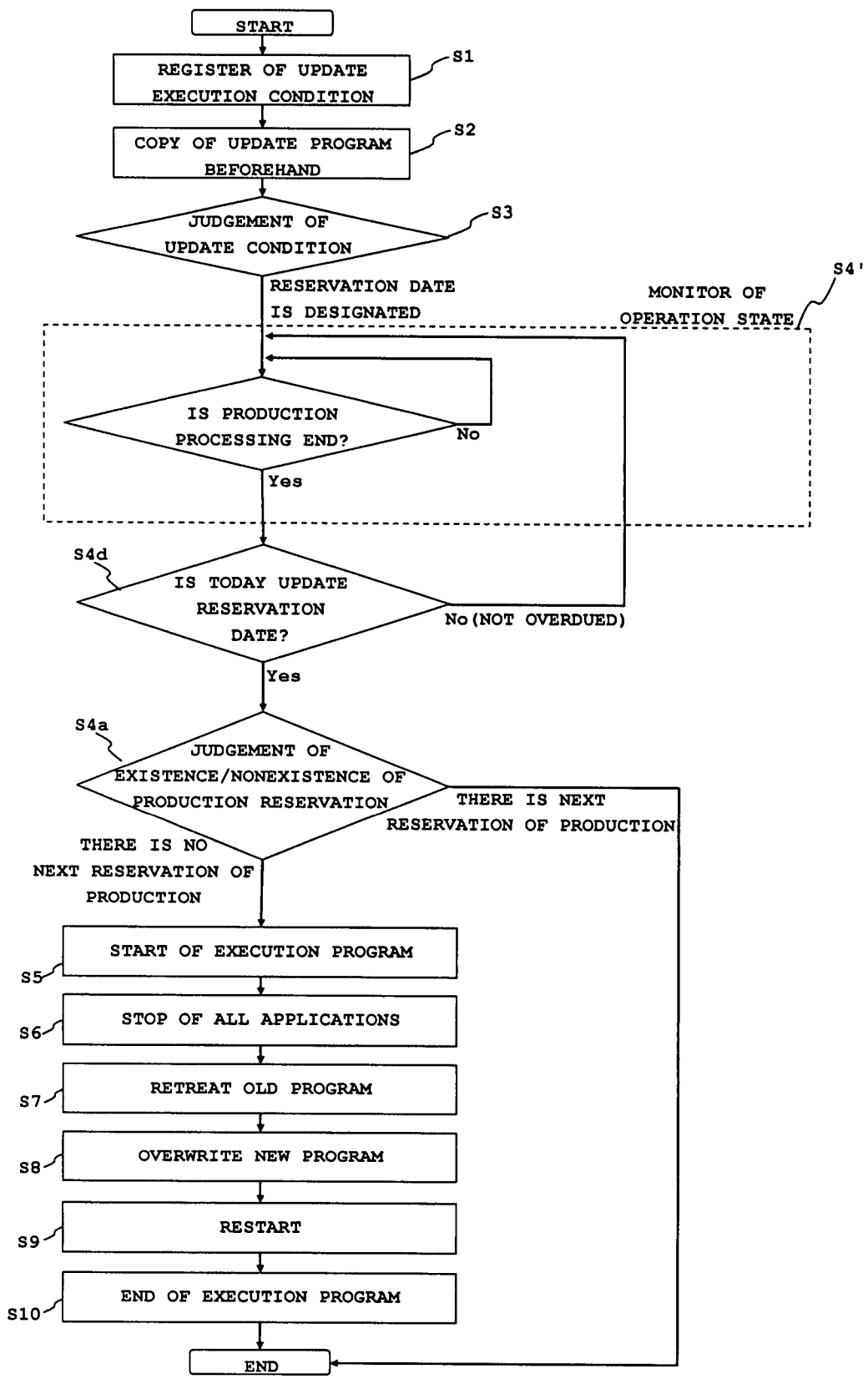
FIG. 13 is an operation flowchart of the update method of the program executed by the substrate processing system according to an example 5 of the present invention.
Figure 14:
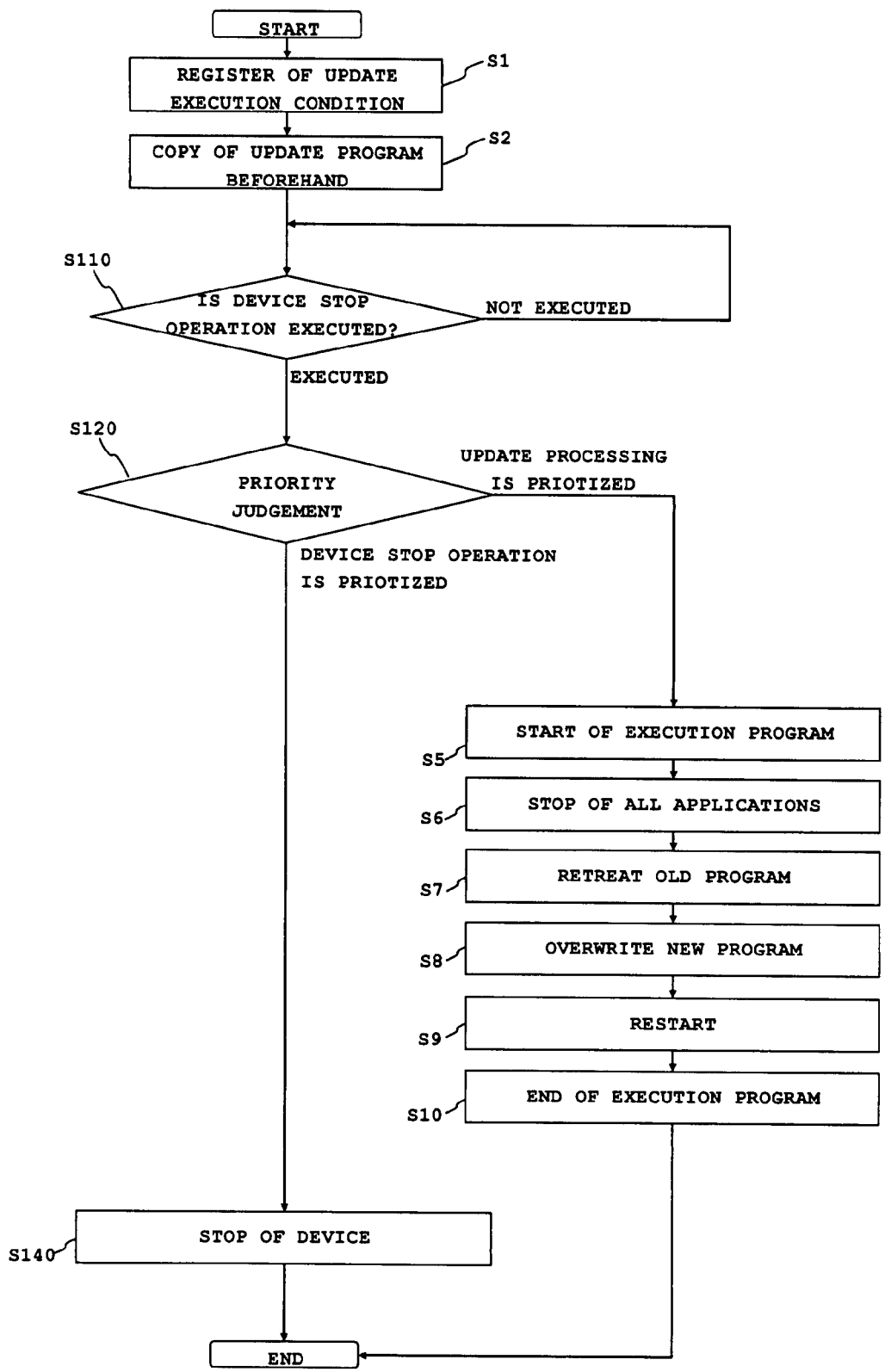
FIG. 14 is an operation flowchart of the update method of the program executed by the substrate processing system according to an example 6 of the present invention.

Subsequently, an example 5 of the present invention will be explained with reference to FIG. 12 and FIG. 13. FIG. 12 is an outline view of the reservation screen of the update program displayed in the group management device according to the example 5 of the present invention, FIG. 5A is the outline view of the reservation screen for performing reservation of updating the program to a plurality of substrate processing apparatuses simultaneously, and FIG. 5B is the outline view of the update object device selection screen for selecting the substrate processing apparatus, being an update object. Also, FIG. 13 is an operation flowchart of the update method of the program executed by the substrate processing system according to the example 5 of the present invention. The substrate processing system according to this example is different from the aforementioned example in the point that the report message showing "scheduled date of update" and "existence/non-existence of the production reservation on the scheduled date of update" can be inputted as the reservation information of update.

Specifically, under the control of the group management device controller 21 according to this example, a reservation screen 27 of the update program shown in FIG. 12A is displayed on the touch panel 22a of the operation terminal 22. Then, by touching a selection column 26c of "update execution condition" by the maintenance person, the report message showing "scheduled date of update" can be inputted as the reservation information. Also, by touching a selection column 27j of "reservation of substrate processing" by the maintenance person, the report message showing "existence/non-existence of the production reservation on the scheduled date of update" can be inputted as the reservation information.

A flow of this example is shown in FIG. 13. First, in the registering step of the update execution condition (S1), the maintenance person operates the touch panel 22a and inputs the report message showing the "scheduled date of update" and the "existence/non-existence of the production reservation on the scheduled date of update" as the reservation information of update of the program. Note that when there is no input regarding the existence/non-existence of the schedule of the production processing, it can be so set as "None" for the schedule of the production processing, as a default value. Such information inputted by the maintenance person is stored in the update reservation information area 21g of the storage area 21e in the same way as the aforementioned examples.

Then, after executing the preliminary copying step of the update program (S2), the group management, device controller 21 executes the judgment step of the update condition (S3), and when the reservation information of update stored in the update reservation information area 21g shows the scheduled date of update, executes the monitoring step of the operation state (S4') shown in the example 3.

When the production processing is ended, the group management device controller 21 executes a date judgment step (S4d). Namely, whether or not the date of executing the date judgment step (S4d) and the scheduled date of update are identical is compared. Then, when they are identical, the judgment step of the existence/non-existence of the production reservation (S4a) is executed. Also, when the date of executing the date judgment step (S4d) is before the scheduled date of update, the group management device controller 21 repeatedly executes the monitoring step (S4') of the operation state and waits until the scheduled date of update arrives.

In the judgment step of the existence/non-existence of the production reservation (S4a), the group management device controller 21 collects the information regarding the existence/non-existence of the next production reservation from the substrate processing apparatus 10, and when there is no next production reservation, executes the step of the aforementioned steps S5 to S10 and updates the program. Also, when there is the production reservation on the scheduled date of update, the update is canceled.

According to this example, since the "scheduled date of update" is used as the reservation information, for example, a reservation work becomes easy when update is executed on holiday when no operation plan is scheduled. Also, since the "existence/non-existence of the production reservation on the scheduled day of update" is also used as the reservation information, the reservation work for exceptionally performing operation on holiday also becomes easy. Note that as described above, the scheduled date of update is inputted in a form of date, as the reservation information. However, the reservation work is not limited thereto, and the information with date further added with time may be inputted.

EXAMPLE 6

Subsequently, an example 6 of the present invention will be explained. The substrate processing system according to this example is different from the aforementioned example in the point that the update of the program is prioritized over stop operation, before performing the stop operation to the substrate processing apparatus 10.

First, in the same way as the aforementioned examples, the registering step of the update execution condition (S1) is executed. Specifically, the maintenance person operates the touch panel 22a and inputs the priority report message showing whether or not the update of the program is prioritized over the stop operation and is performed to the substrate processing apparatus 10. The information inputted by the maintenance person is stored in the update reservation information area 21g of the storage device 21e in the same way as the aforementioned examples. Then, in the same way as the aforementioned examples, the preliminary copying step of the update program (S2) is executed by the group management device controller 21.

Then, the monitoring step of the stop operation that monitors the existence/non-existence of the stop operation is performed to the substrate processing apparatus 10. Specifically, when the maintenance person operates the touch panel 240b and inputs a command to stop the substrate processing apparatus 10, the substrate processing apparatus controller 240 prepares the report message showing "stop operation is executing", and transmits it to the group management device 20 through the communication port 239d. The group management controller 21 receives the report message through the communication port 39d, and executes a priority judgment processing step (S120) as will be described later.

In the priority judgment processing step (S120), the group management controller 21 judges which of the report message "update of the program" or "stop operation to the substrate processing apparatus 10" should be prioritized. Specifically, the group management controller 21 reads the priority information stored in the update reservation information area 21g of the storage device 21e, and when such priority information shows the report message of "update of the program should be prioritized", executes the aforementioned steps S5 to S10 to update the program, and executes the stopping step of the substrate processing apparatus 10 (S140). In addition, when such priority information shows the report message of "the stop operation to the substrate processing apparatus 10 should be prioritized", the group management controller 21 executes the stopping step of the substrate processing apparatus 10 (S140) without performing update.

According to this example, the update of the program can be prioritized over the stop operation of the substrate processing apparatus 10, before the substrate processing apparatus 10 is stopped. Note that in this example, for example, explanation is given to a case of inputting the priority information showing whether or not the update of the program is prioritized over the stop operation by the maintenance person in the registering step of the update execution condition (S1). However, the present invention is not limited thereto. Namely, the group management controller 21 that receives the report message displays this message on the touch panel 22a, and urges the maintenance person to input the priority information (namely, inquires of the maintenance person for the priority of update and stop operation).

EXAMPLE 7

Subsequently, an example 8 of the present invention will be explained. The substrate processing system according to this example is different from the aforementioned example, in the point that after the registering step of the update execution condition (S1) and the preliminary copying step of the update program (S2) are executed, steps from the starting step of the update execution program (S5) to an overwriting step of a new program (S8) are instantly executed, and execution of the restarting step of the application program (S9) is temporarily suspended. Specifically, after completing the execution of the overwriting step of the new program (S8), the group management device controller 21 displays on the touch panel 22a an inquiry screen showing a screen (such as "is the program restarted?" inquiring for the input of permission regarding the execution of the re-starting step of the application program (S9). Then, the group management device controller 21 temporarily suspends the execution of the restarting step of the application program (S9) until there is the input of the report message showing the execution of the restarting step of the application program (S9).

According to this example, by previously finishing the overwriting step (S8) of the new program during execution of the substrate processing step, it is possible to perform operation such as prioritizing the reservation of the next production processing. Accordingly, even in a case that a hasty production processing, which is new and not scheduled in an initial production plan, needs to be executed suddenly, such a case also can be responded. In addition, even when the program is erroneously uploaded by the maintenance person, such an upload can be canceled.

PREFERRED ASPECTS OF THE PRESENT INVENTION

Preferred aspects of the present invention will be additionally described hereunder.

A first aspect provides a substrate processing system, comprising:

a substrate processing apparatus that processes a substrate; and a group management device connected to at least one or more substrate processing apparatuses, so that the group management device monitors an operation state of the substrate processing apparatus, grasps a timing of updating a program of the substrate processing apparatus, and updates the program when the timing arrives.

A second aspect provides a substrate processing system, comprising:

at least one or more substrate processing apparatuses that process a substrate; and a group management device connected to each of the substrate processing apparatuses, so that the group management device receives an input of reservation information showing a message that a program of the substrate processing apparatus is updated when production processing is ended by the substrate processing apparatus, monitors an operation state of the substrate processing apparatus and detects an end of the production processing, confirms existence/non-existence of a reservation of the next production processing in the substrate processing apparatus, and when the substrate processing apparatus does not have the production reservation, updates the program.

A third aspect provides a substrate processing system, comprising:

at least one or more substrate processing apparatuses that process a substrate; and a group management device connected to each substrate processing apparatus, so that the group management device receives an input of reservation information including information showing a message that a program of the substrate processing apparatus is updated when production processing of prescribed number of times is ended by the substrate processing apparatus, and priority information showing a message that which of the processing such as updating the program or the next production processing is prioritized, monitors an operation state of the substrate processing apparatus and detects an end of the production processing of prescribed number of times, confirms existence/non-existence of reservation of the next production processing and the priority information in the substrate processing apparatus, and updates the program when the substrate processing apparatus does not have the next production reservation or even if the substrate processing apparatus has the next production reservation, when the priority information shows a message that the update of the program is prioritized.

A fourth aspect provides a substrate processing system, comprising:

a substrate processing apparatus that processes a substrate; and a group management device connected to at least one or more substrate processing apparatuses, so that the group management device receives an input of reservation information showing a scheduled date on which a program of the substrate processing apparatus is updated, monitors an operation state of the substrate processing apparatus and detects an end of production processing, compares the date of detecting the end of the production processing of the substrate processing apparatus and the scheduled date, and when the date of detecting the end of the production processing of the substrate processing apparatus and the scheduled date are identical, confirms existence/non-existence of reservation of the next production processing, and when the substrate processing apparatus does not have the next production reservation, updates the program.

A fifth aspect provides a substrate processing system having at least one or more of substrate processing apparatuses that process a substrate; and a group management device connected to each substrate processing apparatus, so that the group management device receives an input of reservation information including priority information showing which of the processing is prioritized, such as the processing of updating a program of the substrate processing apparatus or the processing of stop operation of the substrate processing apparatus, and the group management device confirms the priority information when it is so detected that the stop operation is going to be performed to the substrate processing apparatus, and when the priority information shows that updating of the program should be prioritized, the program is updated before the stop operation is executed to the substrate processing apparatus.

A sixth aspect provides a substrate processing apparatus that processes a substrate, so that an operation state of the substrate processing apparatus is monitored by a group management device connected to the substrate processing apparatus, a timing of updating a program of the substrate processing apparatus is grasped, and the program is updated when the timing arrives.

A seventh aspect provides a group management device connected to at least one or more substrate processing apparatuses, so that the group management device monitors an operation state of the substrate processing apparatus, grasps a timing of updating a program of the substrate processing apparatus, and updates the program when the timing arrives.

Other Embodiment

Note that a semiconductor manufacturing device is shown as an example of the substrate processing apparatus. However, the substrate processing apparatus is not limited to the semiconductor manufacturing device, and may be an apparatus that processes a glass substrate such as an LCD apparatus. In addition, regardless of a specific content of substrate processing, the substrate processing may be not only a film formation processing but also the processing such as annealing, oxidizing, nitriding, and diffusion processing. Also, the film formation processing may be the processing of CVD, PVD, the processing of forming an oxide film and a nitride film, and the processing of forming a film containing metal.

What is claimed is:

1. A substrate processing system, comprising:
   at least one or more of substrate processing apparatuses that process a substrate; and
   a group management device connected to each substrate processing apparatus,
   wherein said group management device:
   displays an input stand-by screen regarding an execution condition of an update,
   receives an input of reservation information including information showing a message of updating an application program of said substrate processing apparatus when a production processing of prescribed number of times is ended by said substrate processing apparatus, and including priority information containing an information of whether an update of the application program of the substrate processing apparatus or a next production processing of the substrate processing apparatus is prioritized,
   displays a selection screen of an update program, being an update object, and when a kind and a version of the update program is selected, transmits the selected update program to an update preparation area of a storage device provided in the substrate processing apparatus,
   monitors an operation state of said substrate processing apparatus and detects an end of the production processing of prescribed number of times, confirms existence or non-existence of the next production processing and priority information in said substrate processing apparatus, and
   instructs the update of the application program to said substrate processing apparatus when (1) said substrate processing apparatus does not have the next production reservation or (2) even if said substrate processing apparatus has the next production reservation when the priority information shows that the update of the application program should be prioritized.

2. The substrate processing system according to claim 1, wherein when said substrate processing apparatus receives the instruction of update of the application program by executing an update execution program, said substrate processing apparatus:
   retreats an old application program stored in an execution application area of said storage device into an old version retreat area,
   ends the update execution program when the start of the update program transmitted to the update preparation area is successful, and
   overwrites and copies said old application program retreated in the old version retreat area into said execution application area and starts said old application program when the start of the update fails.

3. A group management device connected to at least one or more of substrate processing apparatuses that process a substrate,
   wherein said group management device:
   displays an input stand-by screen regarding an execution condition of an update,
   receives an input of reservation information including information showing a message of updating an application program of said substrate processing apparatus when a production processing of prescribed number of times is ended by said substrate processing apparatus, and including priority information containing an information of whether an update of the application program of the substrate processing apparatus or a next production processing of the substrate processing apparatus is prioritized,
   displays a selection screen of an update program, being an update object, and when a kind and a version of the update program is selected, transmits the selected update program to an update preparation area of a storage device provided in the substrate processing apparatus,
   monitors an operation state of said substrate processing apparatus and detects an end of the production processing of prescribed number of times, confirms existence or non-existence of the next production processing and priority information in said substrate processing apparatus, and
   instructs the update of the application program to said substrate processing apparatus when (1) said substrate processing apparatus does not have the next production reservation or (2) even if said substrate processing apparatus has the next production reservation, when the priority information shows that the update of the application program should be prioritized.

4. A non-transitory recording medium for storing a program to realize a function of a group management device by a computer, said group management device connected to at least one or more of substrate processing apparatuses that process a substrate, wherein said group management device:

displays an input stand-by screen regarding an execution condition of an update, receives an input of reservation information including information showing a message of updating an application program of said substrate processing apparatus when a production processing of prescribed number of times is ended by said substrate processing apparatus, and including priority information containing an information of whether an update of the application program of the substrate processing apparatus or a next production processing of the substrate processing apparatus is prioritized, displays a selection screen of an update program, being an update object, and when a kind and a version of the update program is selected, transmits the selected update program to an update preparation area of a storage device provided in the substrate processing apparatus, monitors an operation state of said substrate processing apparatus and detects an end of the production processing of prescribed number of times, confirms existence or non-existence of the next production processing and priority information in said substrate processing apparatus, and instructs the update of the application program to said substrate processing apparatus when (1) said substrate processing apparatus does not have the next production reservation or (2) even if said substrate processing apparatus has the next production reservation, when the priority information shows that the update of the application program should be prioritized.

5. A substrate processing system, comprising:

at least one or more of substrate processing apparatuses that process a substrate; and a group management device connected to each substrate processing apparatus, wherein said group management device:

displays an input stand-by screen regarding an execution condition of an update, receives an input of reservation information including priority information containing an information of whether an update of an application program of the substrate processing apparatus or a stop operation of the substrate processing apparatus is prioritized, displays a selection screen of an update program, being an update object, and when a kind and a version of the update program is selected, transmits the selected update program to an update preparation area of a storage device provided in the substrate processing apparatus, and confirms said priority information when it is so detected that the stop operation is going to be performed to said substrate processing apparatus, and when the priority information shows that the update of the application program should be prioritized, instructs the update of the application program to said substrate processing apparatus before the stop operation is executed to said substrate processing apparatus.

6. The substrate processing system according to claim 5, wherein when said substrate processing apparatus receives the instruction of update of the application program by executing an update execution program, said substrate processing apparatus:

retreats an old application program stored in an execution application area of said storage device into an old version retreat area, ends the update execution program transmitted to the update preparation area when the start of the update program is successful, and overwrites and copies said old application program retreated in the old version retreat area into said execution application area and starts said old application program when the start of the update fails.

7. A group management device connected to at least one or more of substrate processing apparatuses that process a substrate, wherein the group management device:

displays an input stand-by screen regarding an execution condition of an update, receives an input of reservation information including priority information containing an information of whether an update of an application program of the substrate processing apparatus or a stop operation of the substrate processing apparatus is prioritized, displays a selection screen of an update program, being an update object, and when a kind and a version of the update program is selected, transmits the selected update program to an update preparation area of a storage device provided in the substrate processing apparatus, and confirms said priority information when it is so detected that the stop operation is going to be performed to said substrate processing apparatus, and when the priority information shows that the update of the application program should be prioritized, instructs the update of the application program to said substrate processing apparatus before the stop operation is executed to said substrate processing apparatus.

8. A non-transitory recording medium for storing a program to realize a function of a group management device by a computer, said group management device connected to at least one or more of substrate processing apparatuses that process a substrate, wherein said group management device:

displays an input stand-by screen regarding an execution condition of an update, receives an input of reservation information including priority information containing an information of whether an update of an application program of the substrate processing apparatus or a stop operation of the substrate processing apparatus is prioritized, displays a selection screen of an update program, being an update object, and when a kind and a version of the update program is selected, transmits the selected update program to an update preparation area of a storage device provided in the substrate processing apparatus, and confirms said priority information when it is so detected that the stop operation is going to be performed to said substrate processing apparatus, and when the priority information shows that the update of the application program should be prioritized, instructs the update of the application program to said substrate processing apparatus before the stop operation is executed to said substrate processing apparatus.

* * * * *